US010110960B2

(12) United States Patent
Roberts et al.

(10) Patent No.: US 10,110,960 B2
(45) Date of Patent: Oct. 23, 2018

(54) METHODS AND SYSTEMS FOR FACILITATING MEDIA-ON-DEMAND-BASED CHANNEL CHANGING

(71) Applicant: Verizon and Redbox Digital Entertainment Services, LLC, Basking Ridge, NJ (US)

(72) Inventors: Brian F. Roberts, Dallas, TX (US); Anthony Lemus, Irving, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 493 days.

(21) Appl. No.: 14/142,018

(22) Filed: Dec. 27, 2013

(65) Prior Publication Data

US 2015/0019968 A1 Jan. 15, 2015

Related U.S. Application Data

(60) Provisional application No. 61/846,603, filed on Jul. 15, 2013.

(51) Int. Cl.
*H04N 21/472* (2011.01)
*H04N 21/482* (2011.01)
(Continued)

(52) U.S. Cl.
CPC ......... *H04N 21/472* (2013.01); *G06F 3/0482* (2013.01); *G06F 3/0484* (2013.01); *G06F 3/04842* (2013.01); *G06F 17/30861* (2013.01); *G06Q 20/18* (2013.01); *G06Q 30/0255* (2013.01); *G11B 27/02* (2013.01); *G11B 27/28* (2013.01); *H04L 65/601* (2013.01); *H04N 5/76* (2013.01); *H04N 7/163* (2013.01);
(Continued)

(58) Field of Classification Search
CPC ................ H04N 21/26258; H04N 21/4825
See application file for complete search history.

(56) References Cited

U.S. PATENT DOCUMENTS

2008/0055488 A1* 3/2008 Jagmag .................. H04N 5/50
348/731
2011/0209025 A1* 8/2011 Takahashi ........... H03M 13/356
714/752

(Continued)

*Primary Examiner* — Pinkal R Chokshi
*Assistant Examiner* — Frank Johnson

(57) ABSTRACT

An exemplary method includes a media service system providing a manifest file for use by a media player to perform adaptive bitrate switching in accordance with an adaptive bitrate streaming heuristic, the manifest file including data that associates a first media program provided by an on-demand media service with a first bitrate and a second media program provided by the on-demand media service with a second bitrate; directing the media player to present the first media program; detecting, while the first media program is being presented, a channel change command provided by the user; and directing, in response to the channel change command, the media player to switch from presenting the first media program to presenting the second media program by providing the media player with a command to use the manifest file to switch from the first bitrate to the second bitrate. Corresponding methods and systems are also disclosed.

20 Claims, 17 Drawing Sheets

(51) Int. Cl.
| | |
|---|---|
| *H04N 21/262* | (2011.01) |
| *G11B 27/28* | (2006.01) |
| *H04N 9/79* | (2006.01) |
| *G11B 27/02* | (2006.01) |
| *H04N 21/47* | (2011.01) |
| *H04N 21/466* | (2011.01) |
| *G06Q 20/18* | (2012.01) |
| *G06Q 30/02* | (2012.01) |
| *G06F 3/0484* | (2013.01) |
| *H04L 29/06* | (2006.01) |
| *G06F 3/0482* | (2013.01) |
| *H04N 21/458* | (2011.01) |
| *H04N 7/16* | (2011.01) |
| *H04N 21/2387* | (2011.01) |
| *H04N 21/6587* | (2011.01) |
| *H04N 21/25* | (2011.01) |
| *H04N 21/845* | (2011.01) |
| *H04N 21/8549* | (2011.01) |
| *H04N 5/76* | (2006.01) |
| *G06F 17/30* | (2006.01) |

(52) U.S. Cl.
CPC ....... *H04N 9/7921* (2013.01); *H04N 21/2387* (2013.01); *H04N 21/252* (2013.01); *H04N 21/26258* (2013.01); *H04N 21/26283* (2013.01); *H04N 21/458* (2013.01); *H04N 21/4668* (2013.01); *H04N 21/47* (2013.01); *H04N 21/47202* (2013.01); *H04N 21/47214* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01); *H05K 999/99* (2013.01)

(56) References Cited

U.S. PATENT DOCUMENTS

| | | | |
|---|---|---|---|
| 2012/0047542 A1* | 2/2012 | Lewis | H04N 21/44016 725/97 |
| 2013/0051768 A1* | 2/2013 | Soroushian | H04N 9/80 386/248 |
| 2013/0091249 A1* | 4/2013 | McHugh | H04N 21/23439 709/219 |
| 2013/0121487 A1* | 5/2013 | Lorberbaum | H04L 9/0861 380/44 |
| 2014/0026052 A1* | 1/2014 | Thorwirth | G06F 3/01 715/721 |
| 2014/0280781 A1* | 9/2014 | Gregotski | H04L 65/60 709/219 |
| 2015/0089073 A1* | 3/2015 | Phillips | H04L 65/60 709/231 |

* cited by examiner

METHODS AND SYSTEMS FOR FACILITATING MEDIA-ON-DEMAND-BASED CHANNEL CHANGING

RELATED APPLICATIONS

The present application claims priority under 35 U.S.C. § 119(e) to U.S. Provisional Patent Application No. 61/846,603, filed Jul. 15, 2013. The contents of the provisional patent application are hereby incorporated by reference in their entirety.

BACKGROUND INFORMATION

There are diverse ways for people to find and consume media programs. For example, a person wanting to watch a media program such as a movie may utilize a video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

A video service typically provides a set of service features and tools for use by an end user of the video service to interact with the video service to discover and utilize the features of the video service, such as features for discovering and accessing video programs for user consumption. While a conventional video service provides useful features and tools, there remains room for new and/or improved features and/or tools that may further benefit users of the service, a provider of the service, and/or third parties such as content providers and/or advertisers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
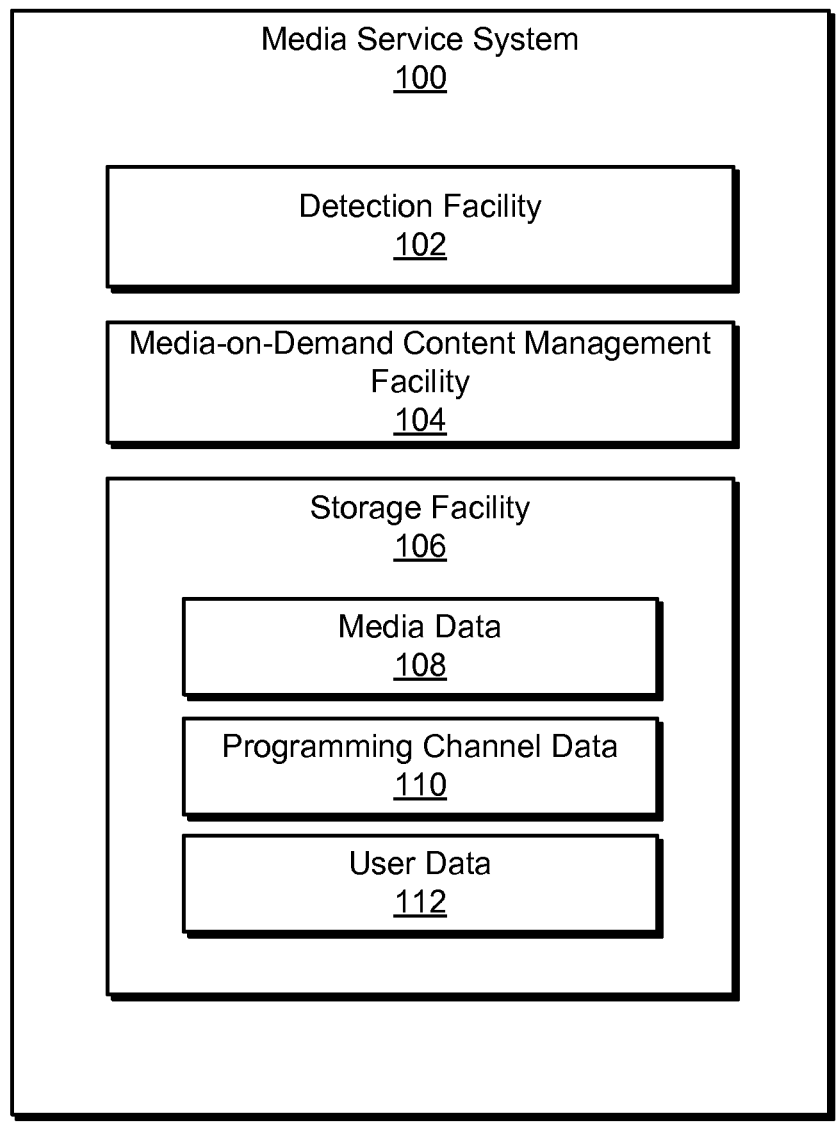
FIG. 1 illustrates an exemplary media service system according to principles described herein.

Methods and systems for facilitating media-on-demand-based channel changing are described herein. As will be described below, the methods and systems described herein may leverage an adaptive bitrate switching capability of a media player in order to "trick" the media player into seamlessly switching between presenting different on-demand media programs (or simply "media programs") provided by an on-demand media service (i.e., a media service that provides on-demand media content for consumption by users of the media service).

For example, a media player may conventionally perform "adaptive bitrate switching" while operating in accordance with an adaptive bitrate streaming heuristic. In adaptive bitrate streaming, a single media program may be encoded at different bitrates. While the media program is being streamed to the media player, the media player may dynamically switch between the different bitrate encodings depending on available resources (e.g., network bandwidth). This facilitates minimal buffering, a fast start time, and a good experience for both high-end and low-end connections. To facilitate adaptive bitrate switching, the media player refers to a manifest file, which includes data indicating the available bitrates as well as pointer data that points to the storage locations (e.g., URLs) of data representative of the different bitrate encodings.

In order to leverage the adaptive bitrate switching capability of a media player to provide the media player with the ability to seamlessly switch between presenting a first on-demand media program and a second on-demand media program (e.g., first and second movies that include different content), for example, the media service system described herein may provide a manifest file that the media player is configured to use to perform adaptive bitrate switching. However, in this case, the manifest file includes data that associates the first media program with a first bitrate and the second media program with a second bitrate. The manifest file may also include pointer data that points to a storage location of a plurality of different data chunks representative of the first and second media programs. The media service system may then direct the media player to present the first media program, detect, while the first media program is being presented, a channel change command provided by the user, and direct, in response to the channel change command, the media player to switch from presenting the first media program to presenting the second media program by providing the media player with a command to use the manifest file to switch from the first bitrate to the second bitrate in accordance with the adaptive bitrate streaming heuristic.

To illustrate, the media service system may detect a request provided by a user for a media player to switch to a media-on-demand-based programming channel. As used herein, a "media-on-demand-based programming channel" refers to a programming channel to which on-demand media content (e.g., a set of selected on-demand media programs) is mapped in accordance with a linear programming schedule for scheduled, linear playback in accordance with the linear programming schedule. In this particular example, at least a first media program and a second media program are mapped to (i.e., included in) the media-on-demand-based programming channel.

In response to the request, the media service system may direct the media player to dynamically generate (e.g., in real time as the media player switches to and/or presents the media-on-demand-based programming channel) a manifest file used by the media player to facilitate adaptive bitrate streaming. The manifest file may include data that associates the first media program with a first bitrate and the second media program with a second bitrate.

The media service system may then direct the media player to use the manifest file to begin presenting (e.g., playing back) the first media program. While the first media program is being presented, the user may provide a channel change command (e.g., by selecting a "channel up" or "channel down" option, which may be a part of a remote control device associated with the media player). The media service system may detect the channel change command, and, in response, direct the media player to switch from presenting the first media program to presenting the second media program by providing the media player with a command to use the manifest file to switch from the first bitrate to the second bitrate in accordance with the adaptive bitrate streaming heuristic.

By leveraging an adaptive switching capability of a media player, the methods and systems described herein may facilitate relatively fast switching between on-demand media programs, thereby providing a channel surfing experience within the context of an on-demand media service and that emulates that of traditional television. Moreover, the methods and systems described herein may promote or otherwise facilitate user discovery and accessing of media content by way of media-on-demand-based programming channels. These and other benefits and/or advantages that may be provided by methods and systems described herein will be made apparent by the following detailed description.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content. System 100 may be associated with (e.g., operated by) a provider of the media service ("service provider").

As shown, system 100 may include, without limitation, a detection facility 102, a media-on-demand content management facility 104 ("management facility 104"), and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and/or external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may be configured to store data generated and/or used by detection facility 102 and/or management facility 104. For example, storage facility 106 may store media data 108 representative of media content that is discoverable and/or accessible through a media service (e.g., an on-demand media service that provides on-demand media programs for access by users of the on-demand media service). As used herein, the term "media content" may refer to any form of media that may be distributed through a media service and discovered, accessed, and/or consumed by a user of the media service. Media content may include discrete instances of media, which may be referred to as media programs. The term "media program" may refer to any on-demand media program, such as an on-demand television program, pay-per-view media program, IPTV media program, advertisement, video, movie, audio program, radio program, or any other media program that a user may access in an on-demand manner by way of the media service. Such media programs that are made available for user consumption through a media service may be accessed and/or played back by an appropriately configured user computing device (e.g., a media player device) for presentation to a user.

Media data 108 may represent actual content included in media content and/or information about the media content. For example, media data 108 may include metadata (e.g., information about genre, cast, title, playback duration, release date, etc.) and/or enriched metadata (e.g., user-defined tags, ratings, etc.) for the media content. In certain examples, media data 108 may represent information about media programs included in a repository of on-demand media content.

Storage facility 106 may include programming channel data 110 used and/or generated by management facility 104. For example, programming channel data 110 may represent one or more media-on-demand-based programming channels generated and/or provided by management facility 104. Storage facility 106 may include user data 112 associated with one or more end users of a media service, such as data representing user profiles of the users. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or management facility 104. In certain examples, data generated by detection facility 102 and/or management facility 104 may be stored permanently or temporarily to storage facility 106.

Detection facility 102 may be configured to detect one or more channel change commands provided by a user of a media player. A channel change command as detected by detection facility 102 may be provided by a user in any suitable manner and by way of any suitable user input device communicatively coupled to or a part of the media player. For example, the user may provide a channel change command by way of a remote control device configured to communicate with the media player (e.g., by pressing "channel up" or "channel down" buttons included in the remote control device). Additionally or alternatively, the user may provide a channel change command by way of any other suitable input device including, but not limited to, a keyboard, a mouse, a touch screen, etc. For example, a user may utilize a touch screen device (e.g., a mobile phone or a tablet computer) to access an on-demand media service. In this example, one or more touch gestures may be performed by the user to provide a channel change command. To illustrate, the user may swipe to the right or to the left on the touch screen device in order to provide channel up and channel down commands.

Management facility 104 may be configured to perform one or more media-on-demand content management operations. For example, management facility 104 may perform one or more operations to generate a media-on-demand-based programming channel and/or to provide access to the media-on-demand-based programming channel. The media-on-demand-based programming channel may be represented in a media service user interface so as to appear, from the perspective of an end user of the media service, to continually distribute on-demand media content mapped to the media-on-demand-based programming channel over time in accordance with the linear programming schedule. Accordingly, from the perspective of the end user of the media service, the distribution of the on-demand media content on the media-on-demand-based programming channel may appear to be "always on" during the linear programming schedule, and if the end user accesses the media-on-demand-based programming channel at a given time, a particular segment of a media program scheduled for distribution by way of the media-on-demand-based programming channel at that particular time is presented to the end user beginning at a playback position mapped to the given time in accordance with the linear programming schedule.

Figure 2:
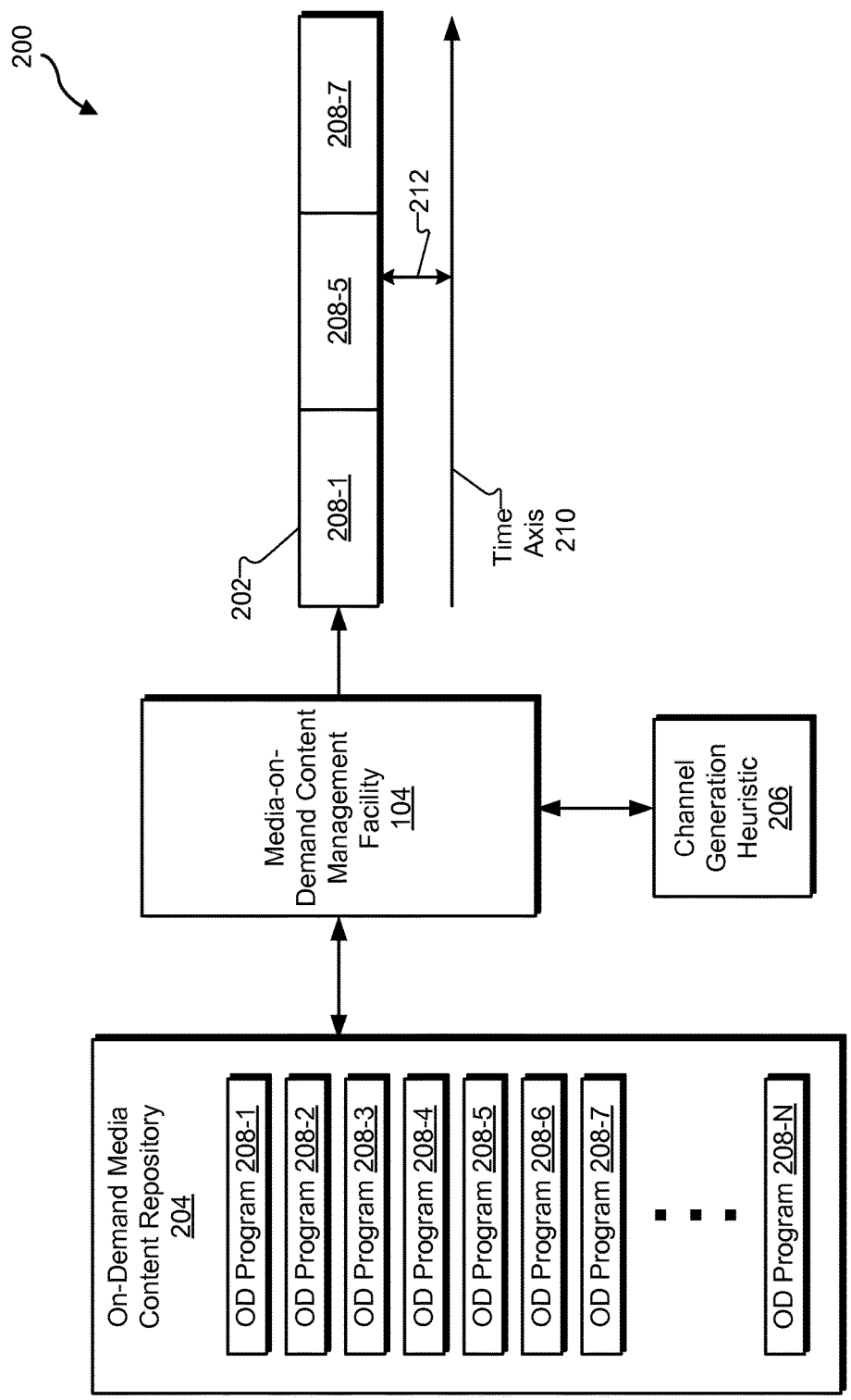
FIG. 2 illustrates an example of a generation of a media-on-demand-based programming channel according to principles described herein.

FIG. 2 illustrates an example of a generation 200 of a media-on-demand-based "always-on" programming channel 202 ("programming channel 202"). As illustrated, management facility 104 may be in communication with or otherwise have access to an on-demand media content repository 204 and a channel generation heuristic 206. Repository 204 may contain data representative of a library of on-demand ("OD") media programs 208 (e.g., programs 208-1 through 208-N). Management facility 104 may use channel generation heuristic 206 (e.g., a set of conditions specified by the channel generation heuristic 206) and information about media programs 208 included in repository 204 (e.g., information specified by media data 108) to select one or more of the media programs 208 to associate with programming channel 202. Management facility 104 may populate programming channel 202 with a set of the selected media programs 208 based on the channel generation heuristic 206. In the illustrated example, management facility 104 has selected and populated programming channel 202 with on-demand media programs 208-1, 208-5, and 208-7, which are serialized linearly relative to a time axis 210 to form a linear playback schedule such that on-demand media program 208-1 is scheduled for playback, followed by playback of on-demand media program 208-5, followed by playback of on-demand media program 208-7 as time passes along time axis 210.

Management facility 104 may map the selected on-demand media programs 208-1, 208-5, and 208-7 to the programming channel 202 to reflect the linear playback schedule in any suitable way. Arrow 212 illustrates a mapping of a particular playback position within media program 208-5 to a particular time on time axis 210. Such a mapping and other mappings may be represented by management facility 104 in any suitable way. For example, management facility 104 may add data representative of the linear playback schedule for the programming channel 202 to a data structure representative of the programming channel 202. The data may specify the selected on-demand media programs 208-1, 208-5, and 208-7, data locations (e.g., memory addresses) at which the on-demand media programs 208-1, 208-5, and 208-7 are accessible, indexing information for the on-demand media programs 208-1, 208-5, and 208-7 such that the index information may be used to access each on-demand media program at any playback position within the on-demand media program, information mapping media program index information (e.g., playback positions) to times of the playback schedule for the programming channel 202, and/or any other information useful for initiating playback of any of the on-demand media programs 208-1, 208-5, and 208-7 at any particular playback position in accordance with the playback schedule of the programming channel 202.

For example, a user may provide input to a user computing device to request access to the programming channel 202 with the user computing device. The access request may be made at a particular time along time axis 210. Management facility 104 may receive the request and use index information in the data structure for the programming channel 202 to determine a particular playback position within a particular on-demand media program associated with the programming channel 202 that is mapped to the time of the access request and initiate playback of the on-demand media program starting at that playback position. Management facility 104 may perform these operations in a manner designed to give an appearance to the user that the user has joined an in-progress "always on" playback of media content associated with the programming channel 202, even though management facility 104 does not actually continually distribute or play back the media programs associated with the programming channel 202 in accordance with the playback schedule.

Management facility 104 may be configured to provide user access to a media-on-demand-based programming channel. As an example, management facility 104 may publish the media-on-demand-based programming channel such that the media-on-demand-based programming channel becomes accessible to one or more end users of a media service. The publishing may be performed in any way suitable to make the media-on-demand-based programming channel accessible through the media service.

A published media-on-demand-based programming channel may be represented in a media service user interface for access by one or more end users of the media service. To this end, management facility 104 may generate and provide a media service user interface that includes user interface content representative of the media-on-demand-based programming channel. The user interface may be in any suitable form. For example, management facility 104 may be configured to provide a website, a client application user interface (e.g., a user interface provided by a client application such as a "mobile app" installed and running on a user computing system), a media player user interface, a graphical user interface, and/or any other form of user interface configured to facilitate interaction with the media service. A user interface provided by management facility 104 may include one or more features and/or tools of the media service, including any of the exemplary features and/or tools described herein.

These and other features of media-on-demand-based programming channels and user interfaces used to provide access to the media-on-demand-based programming channels are described in more detail in U.S. Patent Publication No. 2015/0020105, filed the same day as the present application, and entitled "SYSTEMS AND METHODS OF PROVIDING A MEDIA-ON-DEMAND-BASED PROGRAMMING CHANNEL," the contents of which are incorporated herein by reference in their entirety.

Management facility 104 may be further configured to facilitate media-on-demand-based channel changing. In other words, management facility 104 may be configured to facilitate seamless switching by a media player (e.g., a computing device and/or media player application configured to present media programs) between presentations of media programs mapped to a single media-on-demand-based programming channel and/or between presentations of media programs mapped to different media-on-demand-based programming channels.

To this end, management facility 104 may maintain data chunks representative of time-based segments of each media program mapped to a particular media-on-demand-based programming channel. The segments may be relatively short in duration (e.g., a few seconds). As will be described below, a media player may present a media program by downloading data chunks associated with the media program and presenting the various segments represented by the data chunks.

Figure 3:
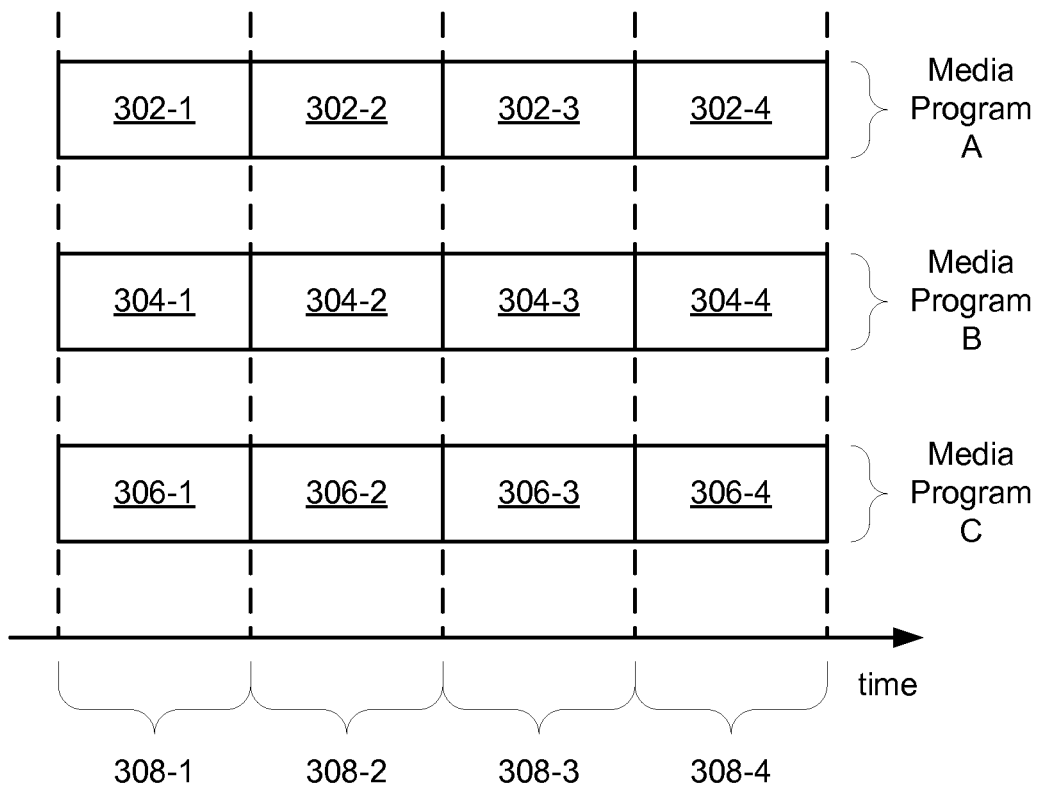
FIG. 3 shows the first four segments of various media programs mapped to a media-on-demand-based programming channel according to principles described herein.

To illustrate, FIG. 3 shows the first four segments of three different media programs (titled "Media Program A," "Media Program B," and "Media Program C") mapped to a particular media-on-demand-based programming channel. As shown, the media program titled "Media Program A" has been divided into segments 302-1 through 302-4 (collectively "segments 302"), the media program titled "Media Program B" has been divided into segments 304-1 through 304-4 (collectively "segments 304"), and the media program titled "Media Program C" has been divided into segments 306-1 through 306-4 (collectively "segments 306"). It will be recognized that each media program may include additional segments as may serve a particular implementation.

Each segment 302, 304, and 306 shown in FIG. 3 may be of any suitable duration as may serve a particular implementation. For example, each segment 302, 304, and 306 may have a duration of two seconds. Segments 302, 304, and 306 may alternatively be shorter in duration (e.g., one second) or longer in duration (e.g., ten seconds) as may serve a particular implementation.

As shown, each segment 302, 304, and 306 included in each media program may be assigned to a particular time slot 308 (e.g., one of time slots 308-1 through 308-4) within a scheduled presentation time period. For example, segments 302-1, 304-1, and 306-1 are each assigned to a first time slot 308-1. Likewise, segments 302-2, 304-2, and 306-2 are each assigned to a second time slot 308-2 and so forth.

As used herein, a segment corresponding to a media program and that is "assigned" to a particular time slot within a scheduled presentation time period is presented during that time slot if the user "tunes" (e.g., by providing a channel change command) to the media program prior to (or, in some cases, during) the time slot without providing any other intervening channel change commands. Examples of this will be provided in more detail below.

Figure 4:
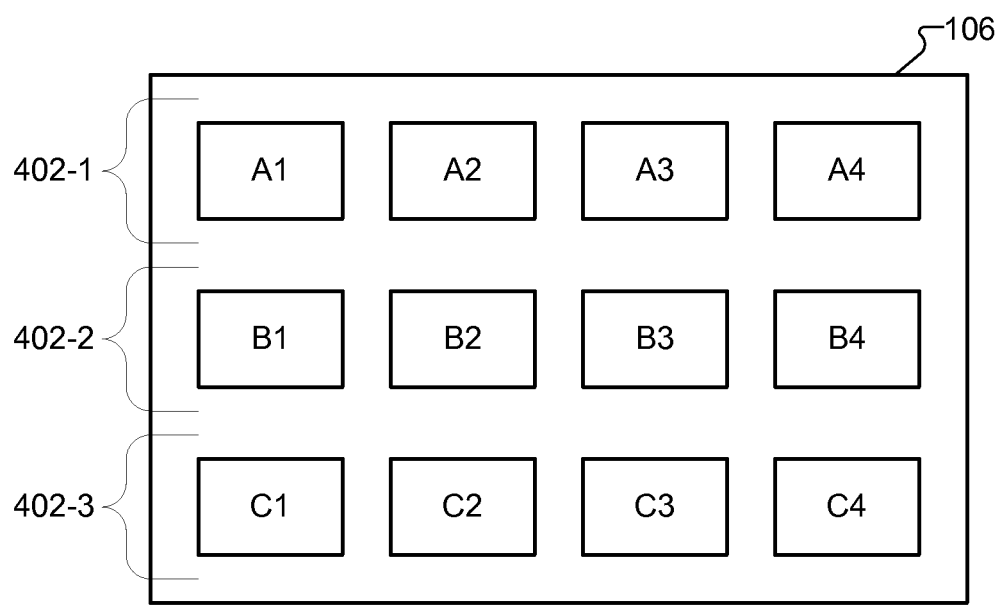
FIG. 4 shows data chunks that may be maintained by the media service system of FIG. 1 according to principles described herein.

Management facility 104 may maintain a set of data chunks for each media program mapped to a particular media-on-demand-based programming channel. Each data chunk is representative of a media program segment. To illustrate, FIG. 4 shows that management facility 104 may maintain a first set of data chunks 402-1 (labeled A1 through A4) representative of segments 302-1 through 302-4 of the media program titled "Media Program A", a second set of data chunks 402-2 (labeled B1 through B4) representative of segments 304-1 through 304-4 of the media program titled "Media Program B", and a third set of data chunks 402-3 (labeled C1 through C4) representative of segments 306-1 through 306-4 of the media program titled "Media Program C". The sets of data chunks 402-1 through 402-3 will be referred to collectively herein as "data chunks 402". As shown, each data chunk 402 may be maintained in storage facility 106 (e.g., in the form of media data 108). Each data chunk 402 may have a unique storage location (e.g., a URL) that may be identified in a request provided by a media player in order to download and present a corresponding segment. This will described in more detail below.

To facilitate presentation of media programs represented by data chunks, such as data chunks 402, management facility 104 may provide a manifest file for use by a media player. As mentioned above, the media player may be configured to use the manifest file to perform adaptive bitrate switching in accordance with an adaptive bitrate streaming heuristic. However, as will now be described, the contents of the manifest file may "trick" the media player into seamlessly switching between presenting different media programs (instead of or in addition to switching between different bitrate streams).

Figure 5:
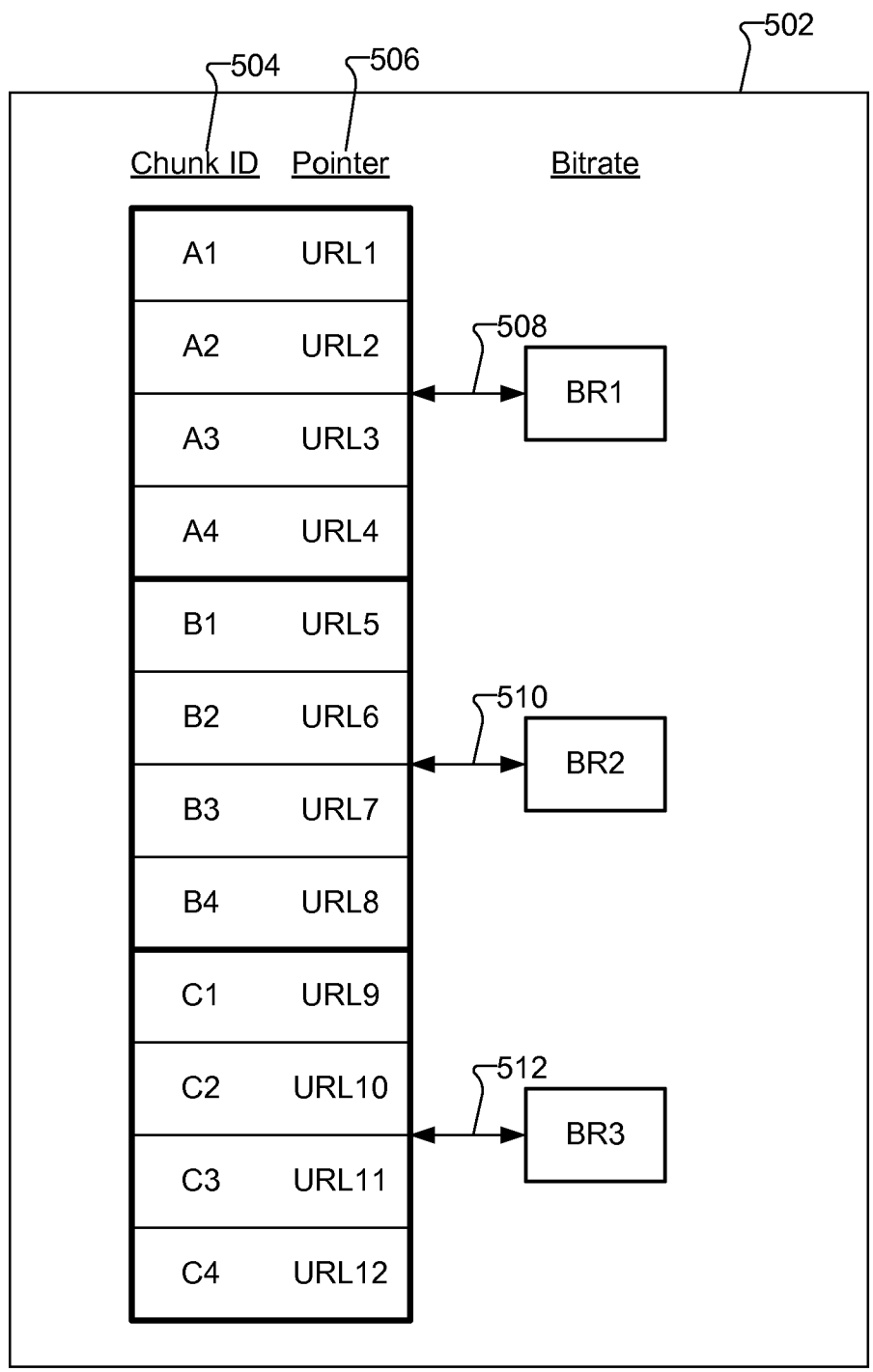
FIG. 5 illustrates an exemplary manifest file according to principles described herein.

FIG. 5 illustrates an exemplary manifest file 502 that may be generated or otherwise provided by management facility 104 for use by a media player. Manifest file 502 may be of any suitable type (e.g., a text file, etc.) and may be compatible with any suitable adaptive bitrate streaming technology (e.g., technologies known as Smooth Streaming and HTTP Live Streaming ("HLS")). Manifest file 502 may be provided for use by the media player in any suitable manner. For example, management facility 104 may provide the media player with network-based access to the manifest file 502 (e.g., in cases where manifest file 502 is stored remotely from the media player). Alternatively, management facility 104 may transmit the manifest file 502 to the media player for local access by the media player.

As shown, manifest file 502 may include a listing 504 of data chunk identifiers ("IDs") associated with the data chunks that represent the various media programs mapped to the particular media-on-demand-based programming channel associated with the manifest file 502. For example, FIG. 5 shows that identifiers for data chunks A1-A4 (i.e., the data chunks representative of the media program titled "Media Program A"), data chunks B1-B4 (i.e., the data chunks representative of the media program titled "Media Program B"), and data chunks C1-C4 (i.e., the data chunks representative of the media program titled "Media Program C") are listed in manifest file 502.

FIG. 5 also shows that pointer data 506 for each data chunk may be included in manifest file 502. The pointer data 506 points to a storage location of each data chunk. For example, FIG. 5 shows that data chunk A1 is located at a storage location labeled "URL1". As will be described below, the pointer data 506 may be used by the media player to download one or more desired data chunks.

Manifest file 502 may also include data that associates each media program mapped to the media-on-demand-based programming channel with a distinct bitrate. For example, arrow 508 represents an association between data chunks (i.e., data chunks A1-A4) representative of the media program titled "Media Program A" and a first bitrate labeled "BR1." Likewise, arrow 510 represents an association between the data chunks (i.e., data chunks B1-B4) representative of the media program titled "Media Program B" and a second bitrate labeled "BR2", and arrow 512 represents an association between the data chunks (i.e., data chunks C1-C4) representative of the media program titled "Media Program C" and a third bitrate labeled "BR3". The association between data chunks and bitrates may be represented in any suitable manner by data within manifest file 502 as may serve a particular implementation.

Even though manifest file 502 includes data associating the various data chunks listed in FIG. 5 with different bitrates, the data chunks are not necessarily encoded with the associated bitrates. For example, each data chunk corresponding to each media program may actually be encoded with the same bitrate. As will be described below, the bitrate associations represented in manifest file 502 are used by the media player to switch between presenting the different media programs represented by the data chunks listed in the manifest file 502 in response to channel change commands provided by a user.

In some examples, manifest file 502 may be static. In other words, manifest file 502 may be prepopulated with data and stored by management facility 104. In these examples, manifest file 502 may be accessed as needed by the media player.

In some alternative examples, manifest file 502 may be dynamically generated in response to a request provided by a user for the media player to switch to the media-on-demand-based programming channel corresponding to the manifest file 502. Dynamic generation of manifest file 502 may take into account any changes that are made to the media-on-demand-based programming channel (e.g., mappings of new media programs to the media-on-demand-based programming channel) prior to and/or while the media-on-demand-based programming channel is being presented by the media player.

Various examples of how manifest file 502 may be used to facilitate seamless switching between media programs mapped to a media-on-demand-based programming channel will now be provided. Although the examples provided herein are in the context of switching between media programs mapped to a single media-on-demand-based programming channel, it will be recognized that the methods and systems described herein may also be used to seamlessly switch between media programs mapped to different media-on-demand-based programming channels.

Figure 6:
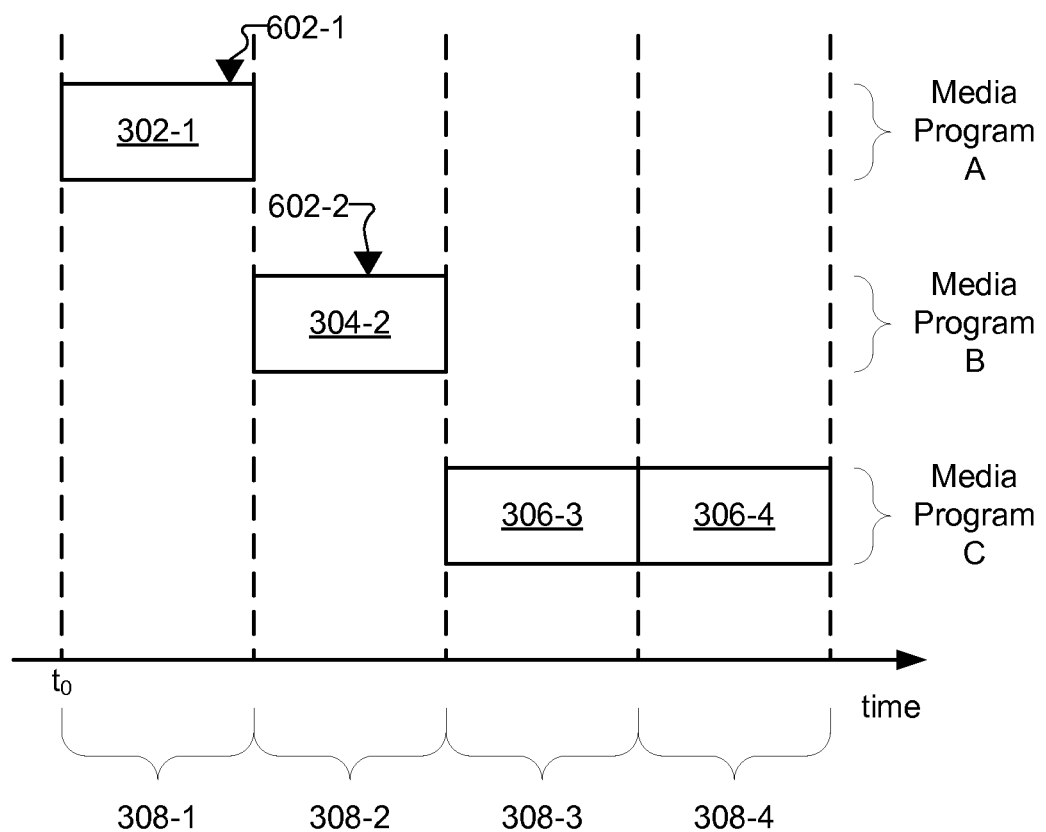
FIGS. 6-7 illustrate various scenarios in which channel change commands are provided by a user while the user experiences a media-on-demand-based programming channel according to principles described herein.

FIG. 6 illustrates an exemplary scenario in which various channel change commands 602 (e.g., channel change commands 602-1 and 602-2) are provided by a user while the user experiences the media-on-demand-based programming channel corresponding to manifest file 502. As shown, the media player may begin presenting the media-on-demand-based programming channel (i.e., presenting a media program mapped to the media-on-demand-based programming channel) at time t0. This may occur, for example, in response to a request provided by a user for the media player to switch to the media-on-demand-based programming channel. The media player may begin presenting the media-on-demand-based programming channel in response to any other event as may serve a particular implementation.

In this particular example, management facility 104 directs the media player to begin presenting the media-on-demand-based programming channel by directing the media player to begin presenting the media program titled "Media Program A" during time slot 308-1. This may include management facility 104 directing the media player to use pointer data (which, in this example, is labeled "URL1") included in manifest file 502 to download the data chunk (i.e., data chunk A1) that represents the first segment 302-1 of the media program titled "Media Program A" and then use the data chunk to present the first segment 302-1 during time slot 308-1. Management facility 104 may alternatively direct the media player to begin presenting any other segment of the media program titled "Media Program A" as may serve a particular implementation.

As shown, detection facility 102 may detect a channel change command 602-1 (which, in this example, is a "channel up" command) provided by the user while the first segment 302-1 of media program titled "Media Program A" is being presented during time slot 308-1. In response to the channel change command 602-1, management facility 104 may direct the media player to switch from presenting the media program titled "Media Program A" (also referred to in this example as the first media program) to presenting a second media program (i.e., the media program titled "Media Program B") by providing the media player with a command to use the manifest file 502 to switch to a different bitrate. For example, management facility 104 may direct the media player to use the manifest file 502 to switch from the bitrate labeled "BR1" to the bitrate labeled "BR2".

In the example of FIG. 6, the media player may be configured to switch to presenting the second media program after the entire first segment 302-1 of the first media program is presented (i.e., at the beginning of time slot 308-2, which is temporally adjacent and subsequent to the first time slot 308-1). Because each segment is relatively short in duration, the user may still perceive that the switch from the first media program to the second media program is relatively seamless, even though there may be a relatively short delay between when the channel change command 602-1 is provided and the beginning of the second time slot 308-2.

In some examples, management facility 104 may direct the media player to switch to presenting the second media program during the second time slot 308-2 by directing the media player to begin presenting a segment included in the second media program that is assigned to the second time slot 308-2. In this manner, the second media program may be perceived by the user as already being "on" (i.e., in the middle of a scheduled presentation) when the media player begins presenting the second media program.

To illustrate, in response to the channel change command 602-1, management facility 104 may direct the media player to use pointer data (which, in this example, is labeled "URL6") included in manifest file 502 to download a data chunk (i.e., data chunk B2) that represents a segment (i.e., segment 304-2) of the second media program (i.e., the media program titled "Media Program B") that is assigned to the second time slot 308-2. The data chunk may then be used by the media player to present segment 304-2 during the second time slot 308-2, as illustrated in FIG. 6.

FIG. 6 shows that another channel change command 602-2 may be provided by the user during the presentation of the second media program (i.e., during the presentation of segment 304-2 during the second time slot 308-2). In response, management facility 104 may direct the media player to switch to presenting the third segment 306-3 of the media program titled "Media Program C" in a manner similar to that described above.

As mentioned, a channel change command (e.g., channel change command 602-1) may be detected during the middle of a particular time slot (e.g., time slot 308-1) while a first media program is being presented. In some alternative examples, the media player may be configured to immediately switch from presenting the first media program to presenting a second media program during the time slot (i.e., instead of waiting until the beginning of the next time slot to make the switch).

Figure 7:
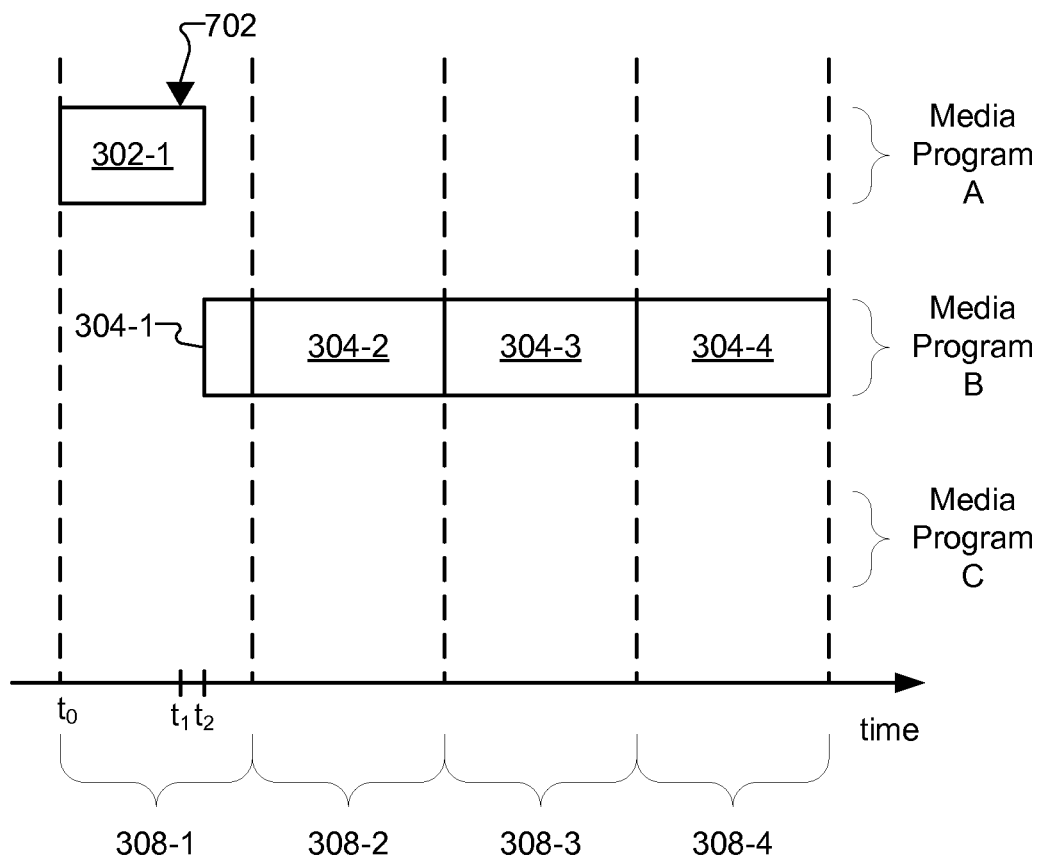

To illustrate, FIG. 7 shows another exemplary scenario in which a channel change command 702 is provided during the presentation of the first media program (i.e., the media program titled "Media Program A") during the first time slot 308-1. In this scenario, management facility 104 may identify a first timestamp (represented in FIG. 7 as time $t_1$) within the first time slot 308-1 at which the channel change command is provided by the user. Management facility 104 may then direct the media player to switch from presenting the first media program to presenting the second media program by directing the media player to use pointer data (which, in this example, is labeled "URL5") included in manifest file 502 to download a data chunk (i.e., data chunk B1) that represents a segment (i.e., segment 304-1) of the second media program that is assigned to the first time slot 308-1. The data chunk may be used by the media player to present segment 304-1 during the first time slot 308-1 beginning at a second timestamp (represented in FIG. 7 as time $t_2$) that is temporally subsequent to the first timestamp, as illustrated in FIG. 7. The temporal distance between the first and second timestamps may be relatively small, and may depend on the switching capabilities of the media player.

In some examples, each data chunk 402 maintained by management facility 104 may be encrypted using a common key. The encryption may be performed by management facility 104 and/or any other system as may serve a particular implementation, and may be performed to satisfy one or more digital rights management requirements. Using a common key to encrypt the data chunks 402 may allow the media player to use the same common key to decrypt and unlock each data chunk 402 for playback. This may obviate the need for the media player to acquire a new key each time the media player switches to a different media program in response to one or more channel change commands. As a result, the noticeable delay (e.g., a delay of several seconds) typically associated with the media player between the time that the user requests the playback of a particular media program and when the playback of the media program actually starts may be minimized (e.g., eliminated).

In some examples, it may be desirable for a media player to use a manifest file to actually perform adaptive bitrate switching in addition to using the manifest file to facilitate media-on-demand-based channel changing. For example, management facility 104 may direct the media player to use a manifest file to switch between standard definition ("SD") versions of media programs (e.g., versions of the media programs that have been encoded at a bitrate of one MB/sec) in response to channel change commands provided by a user. Once a user has settled on a particular media program (e.g., by not providing a channel change command for a predetermined amount of time), management facility 104 may direct the media player to use the manifest file to switch to a high definition ("HD") version of the media program (e.g., a version of the media program that has been encoded at a bitrate of three MB/sec). Additionally or alternatively, the media player may adaptively switch between different resolution versions of the same media program in response to fluctuations in available bandwidth.

Figure 8:
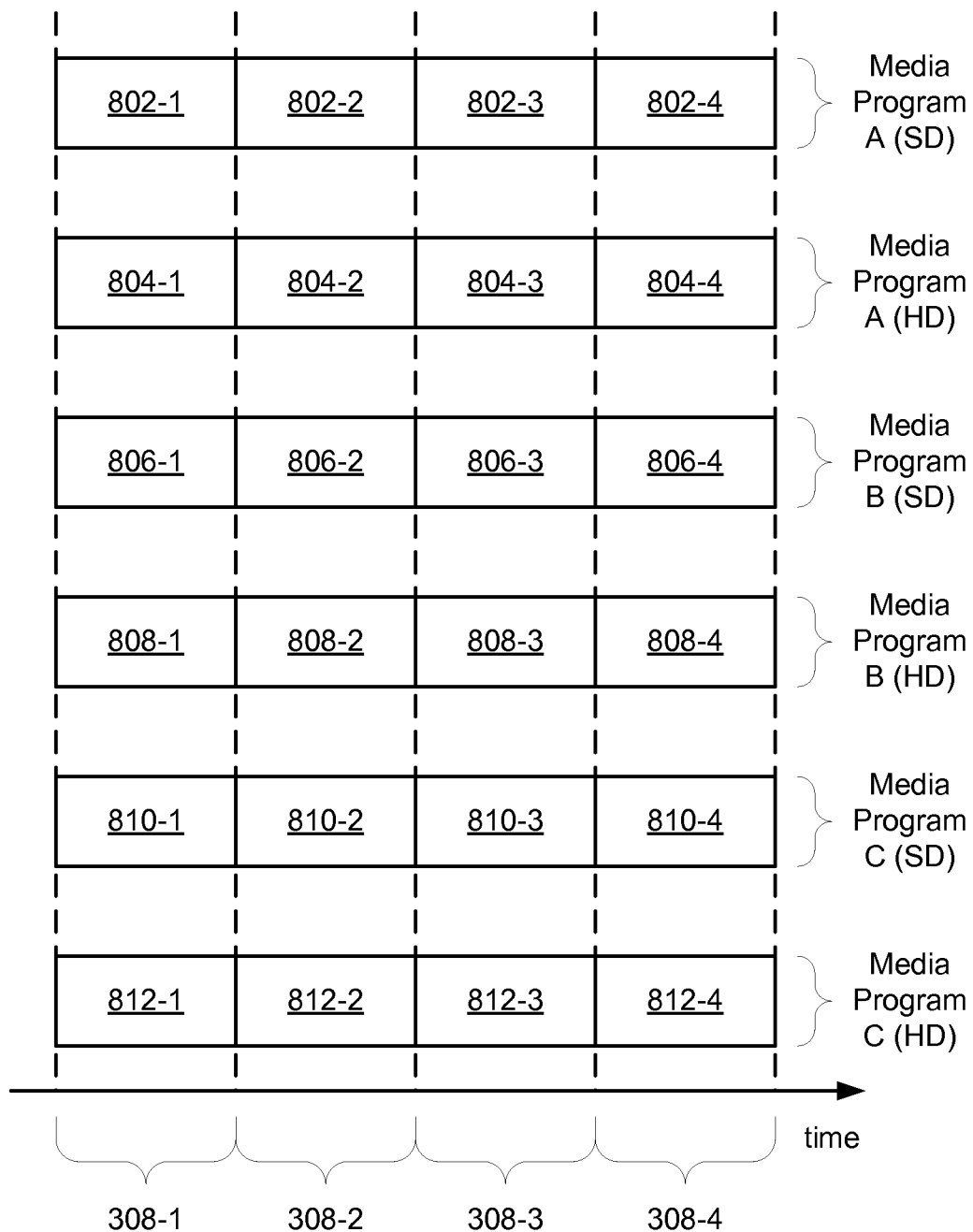
FIG. 8 shows the first four segments of various resolution versions of media programs mapped to a media-on-demand-based programming channel according to principles described herein.

To facilitate adaptive bitrate switching, management facility 104 may map different resolution versions of one or more media programs to a particular media-on-demand-based programming channel. To illustrate, FIG. 8 shows that different resolution versions of the media programs titled "Media Program A", "Media Program B", and "Media Program C" are mapped to a particular media-on-demand-based programming channel. In particular, SD and HD resolution versions of each media program are mapped to the media-on-demand-based programming channel. It will be recognized that additional or alternative resolution versions of each media program may be mapped to the media-on-demand-based programming channel as may serve a particular implementation.

FIG. 8 is similar to FIG. 3 in that it shows the first four segments of each media program mapped to the media-on-demand-based programming channel. For example, FIG. 8 shows the first four segments 802-1 through 802-4 of the SD resolution version of the media program titled "Media Program A" and the first four segments 804-1 through 804-4 of the HD resolution version of the media program titled "Media Program A." Segments 806-1 through 806-4, 808-1 through 808-4, 810-1 through 810-4, and 812-1 through 812-4 corresponding to the SD and HD versions of each of the other media programs mapped to the media-on-demand-based programming channel are also shown in FIG. 8. As described above, each segment is assigned to a particular time slot 308 (e.g., one of time slots 308-1 through 308-4) within a scheduled presentation time period.

Figure 9:
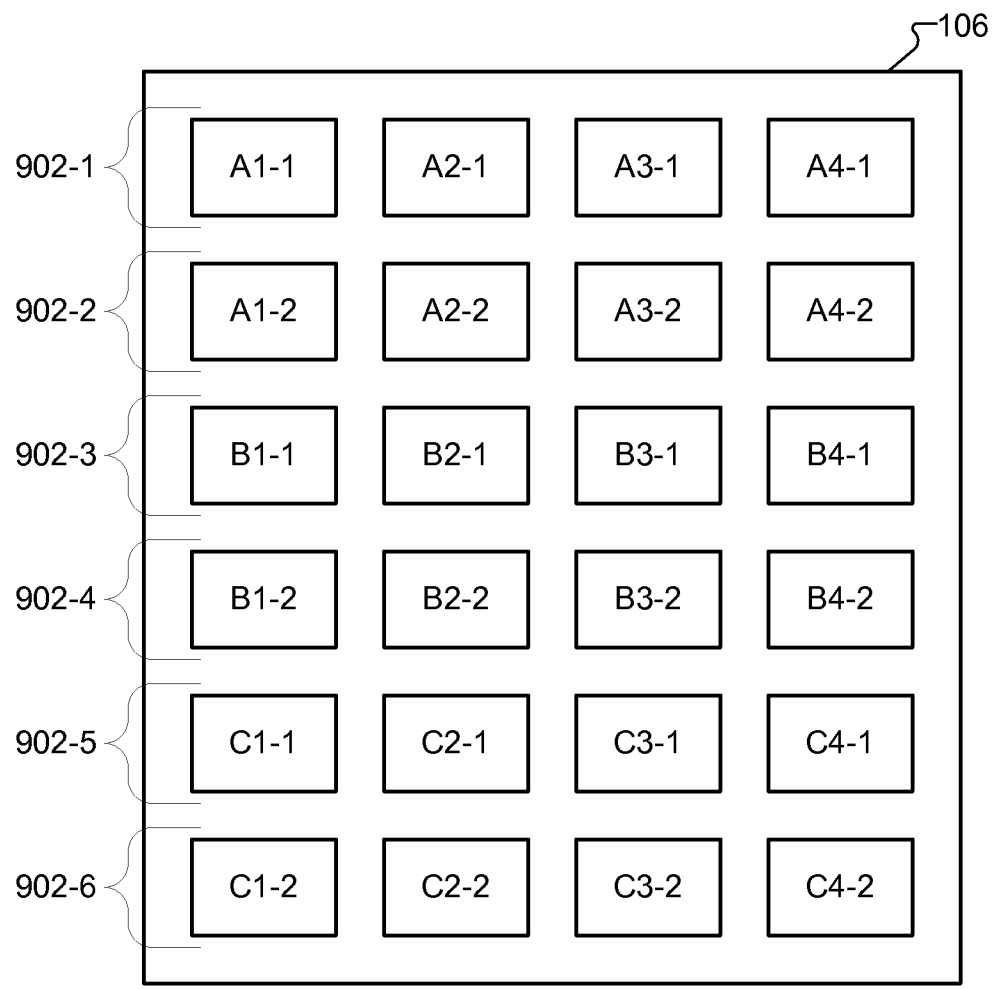
FIG. 9 shows data chunks that may be maintained by the media service system of FIG. 1 according to principles described herein.

Management facility 104 may maintain data chunks representative of each of the segments 802-812 shown in FIG. 8. In particular, FIG. 9 shows that management facility 104 may maintain a first set of data chunks 902-1 (labeled A1-1 through A4-1) representative of segments 802-1 through 802-4, a second set of data chunks 902-2 (labeled A1-2 through A4-2) representative of segments 804-1 through 804-4, a third set of data chunks 902-3 (labeled B1-1 through B4-1) representative of segments 806-1 through 806-4, a fourth set of data chunks 902-4 (labeled B1-2 through B4-2) representative of segments 808-1 through 808-4, a fifth set of data chunks 902-5 (labeled C1-1 through C4-1) representative of segments 810-1 through 810-4, and a sixth set of data chunks 902-6 (labeled C1-2 through C4-2) representative of segments 812-1 through 812-4.

Figure 10:
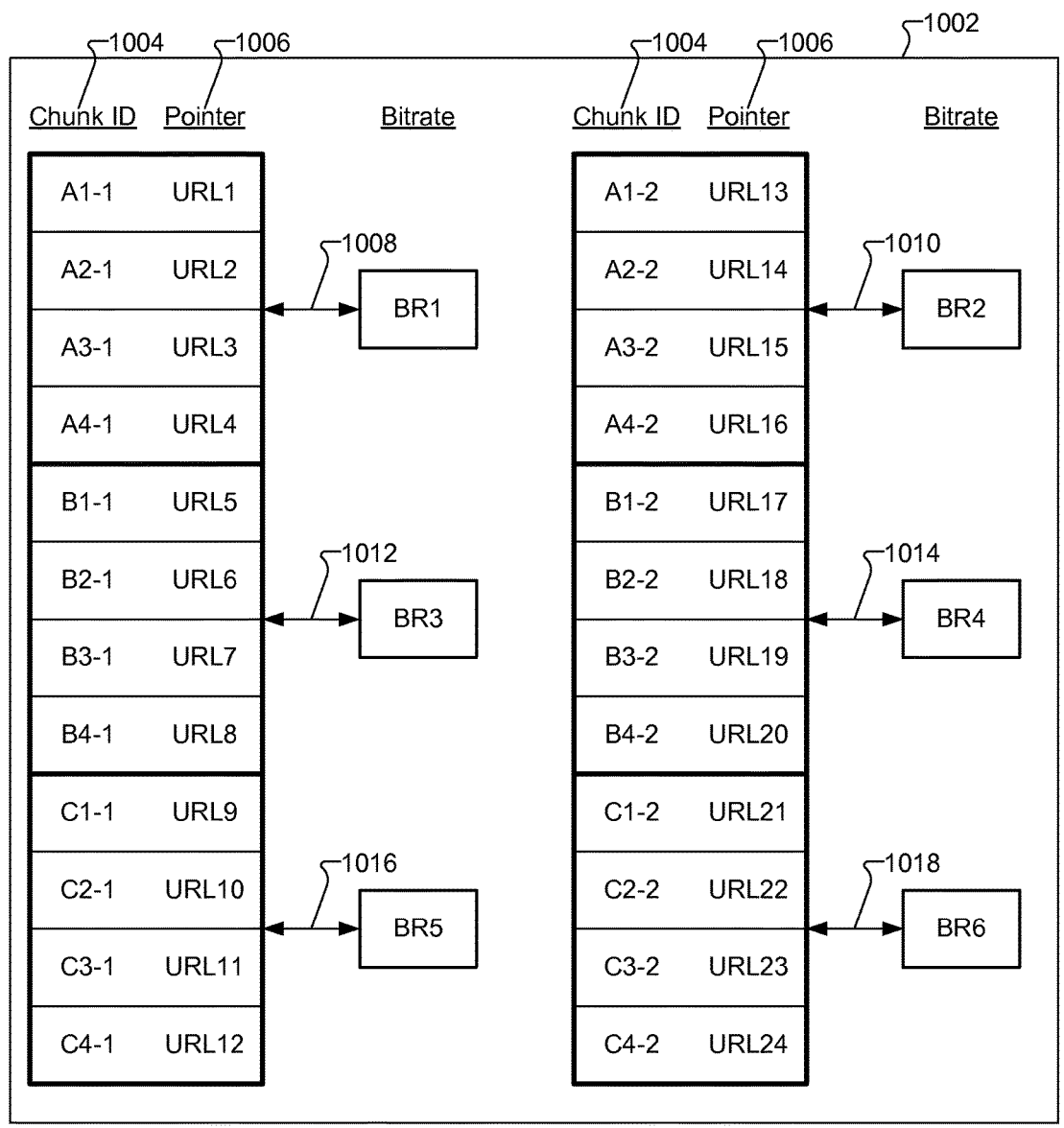
FIG. 10 shows an exemplary manifest file according to principles described herein.

FIG. 10 shows an exemplary manifest file 1002 that corresponds to the media-on-demand-based programming channel to which the different resolution versions represented by data chunks 902 are mapped. As shown, manifest file 1002 may include a listing 1004 of data chunk IDs associated with the data chunks 902 shown in FIG. 9 and pointer data 1006 for each data chunk included in listing 1004.

Manifest file 1002 may also include data that associates each resolution version of each media program mapped to the media-on-demand-based programming channel with a distinct bitrate. For example, arrow 1008 represents an association between data chunks (i.e., data chunks A1-1 through A4-1) representative of the first resolution version of the media program titled "Media Program A" and a first bitrate labeled "BR1." Likewise, arrow 1010 represents an association between data chunks (i.e., data chunks A1-2 through A4-2) representative of the second resolution version of the media program titled "Media Program A" and a second bitrate labeled "BR2." Similar associations between other data chunks and other bitrates are represented by arrows 1012-1018.

Figure 11:
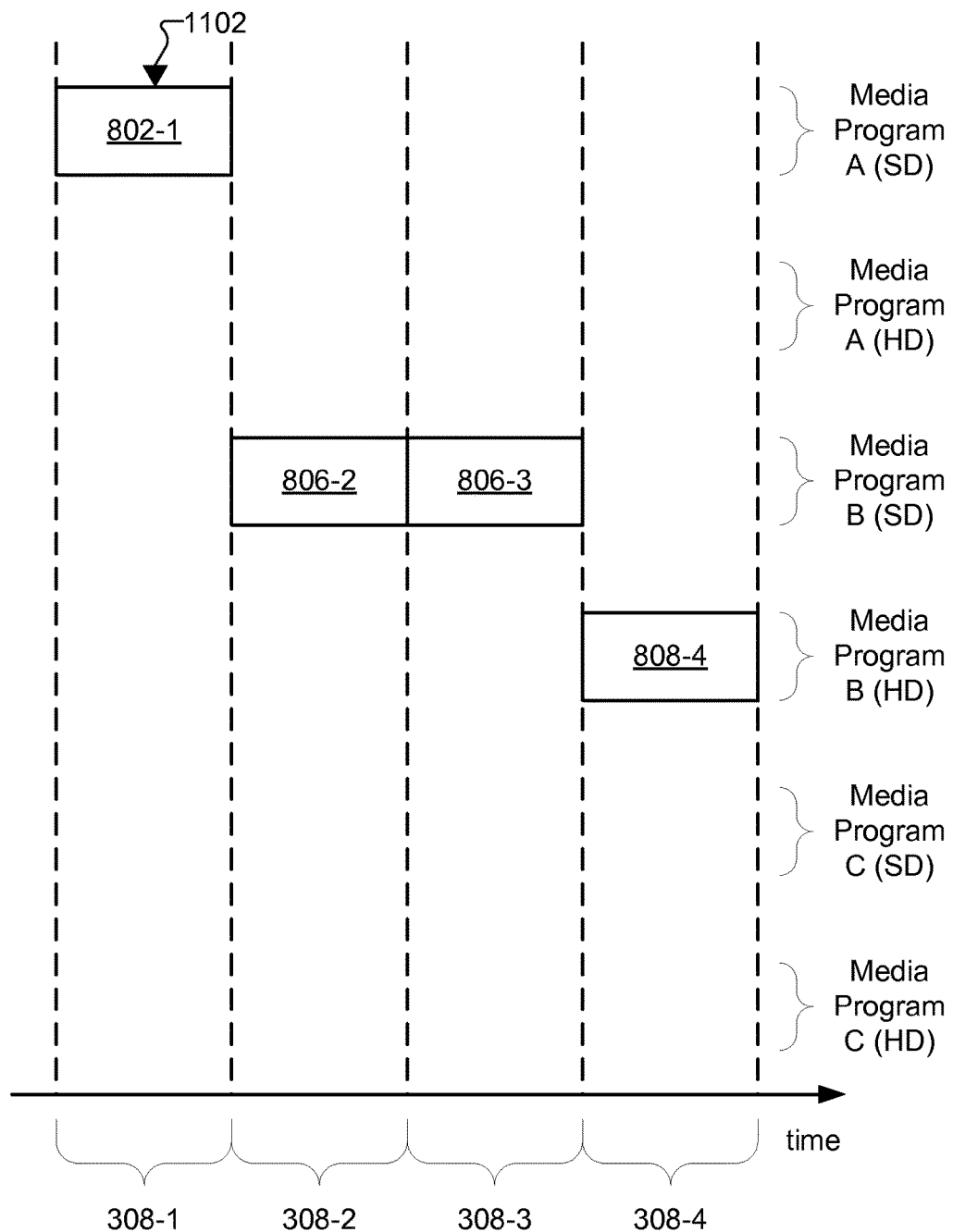
FIG. 11 shows an exemplary scenario in which a manifest file is used to facilitate seamless channel changing and adaptive bitrate switching according to principles described herein.

FIG. 11 shows an exemplary scenario in which the manifest file 1002 is used to facilitate seamless channel changing and adaptive bitrate switching. As shown, a channel change command 1102 may be provided during the presentation of the SD version of a first media program (i.e., the media program titled "Media Program A") during the first time slot 308-1. In response to the channel change command 1102, management facility 104 may direct the media player to switch from presenting the SD version of the first media program to presenting an SD version of a second media program (i.e., the media program titled "Media Program B") by providing the media player with a command to use the manifest file 902 to switch from the bitrate labeled "BR1" to the bitrate labeled "BR3".

As shown in FIG. 11, the SD version of the second media program (i.e., segments 806-2 and 806-3) is presented during time slots 308-2 and 308-3. During this time period, the user may abstain from providing an additional channel changing command for a predetermined amount of time. In response, management facility 104 may direct the media player to switch from presenting the SD version of the second media program to presenting an HD version of the second media program by providing the media player with a command to use the manifest file 902 to switch from the bitrate labeled "BR3" to the bitrate labeled "BR4". As a result, the media player adaptively switches bitrates and begins presenting the fourth segment 808-4 of the HD version of the second media program during time slot 308-4.

System 100 may be embodied in any suitable implementation as may suit a particular application of principles described herein. To illustrate, examples of such implementations will now be described.

Figure 12:
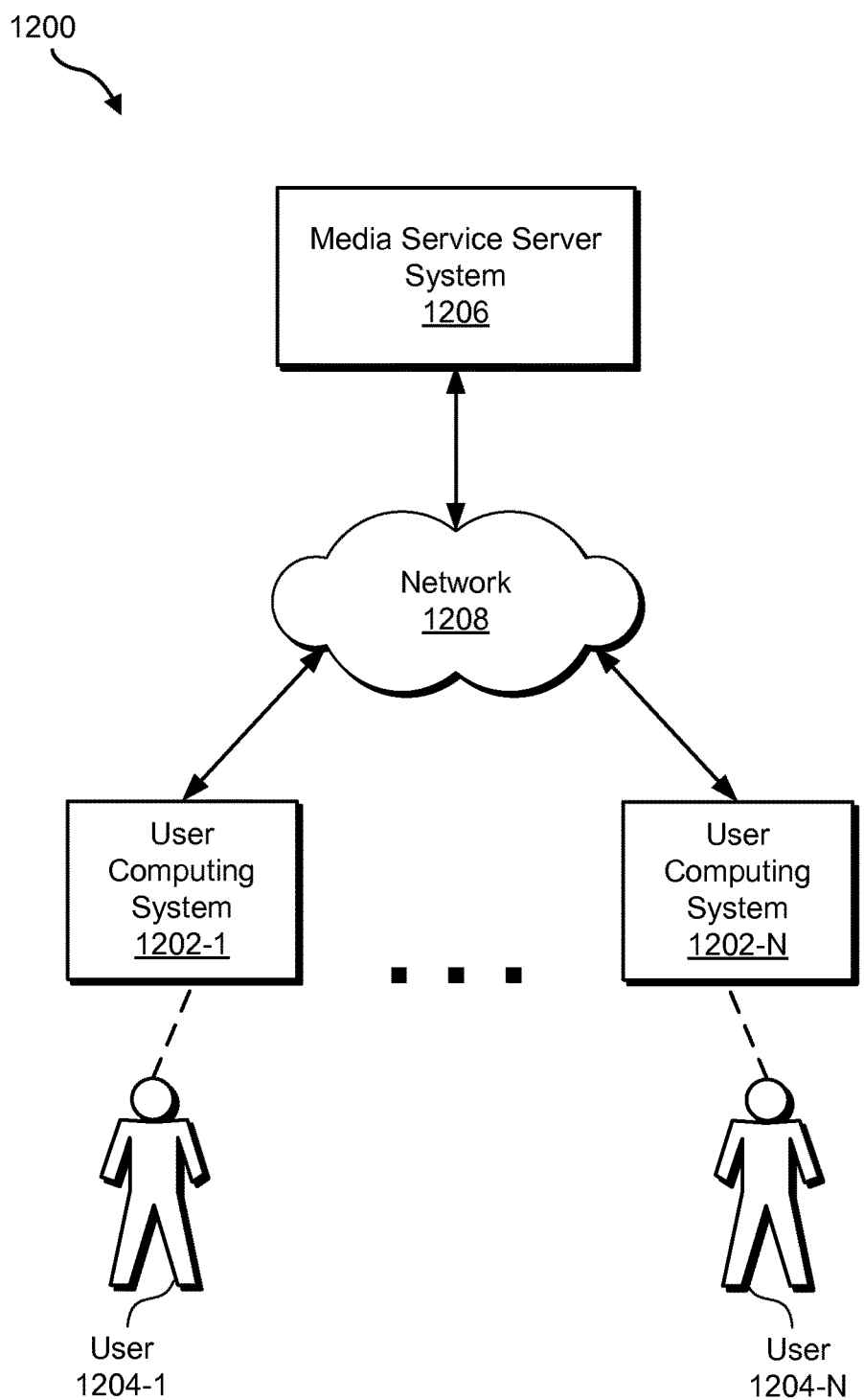
FIG. 12 shows an exemplary implementation of the system of FIG. 1 according to principles described herein.

FIG. 12 shows an exemplary implementation 1200 of system 100. As shown, implementation 1200 may include user computing systems 1202 (e.g., user computing systems 1202-1 through 1202-N) respectively associated with users 1204 (e.g., users 1204-1 through 1204-N), which may be end users of a media service provided by system 100. User computing systems 1202 may be in communication with a media service server system 1206 ("server system 1206"), which may include one or more computing devices (e.g., server devices remotely located from user computing systems 1202). In implementation 1200, one or more of facilities 102-106 of system 100 may be implemented entirely by a user computing system 1202, entirely by server system 1206, or distributed across a user computing system 1202 and server system 1206 in any manner configured to facilitate a user 1204 accessing the media service and/or media programs provided by system 100.

User computing systems 1202 and server system 1206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 1202 and server system 1206 may communicate via a network 1208. Network 1208 may include one or more networks, such as one or more wireless networks (Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media programs) and/or communications signals between user computing systems 1202 and server system 1206. Communications between user computing systems 1202 and server system 1206 may be transported using any one of the above-listed networks, or any combination or sub-combination of the above-listed networks. Alternatively, user computing systems 1202 and server system 1206 may communicate in another way such as by direct connections between user computing systems 1202 and server system 1206.

Server system 1206 may be configured to distribute media programs to user computing systems 1202 for access and use by user computing systems 1202 to present media programs for consumption by users 1204. Server system 1206 may distribute media programs to user computing systems 1202 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 1206 may be configured to stream media programs on-demand to user computing systems 1202 by way of network 1208.

In certain examples, server system 1206 may be configured to provide one or more user interfaces for access by user computing systems 1202. The user interfaces may be configured for use by users 1204 to interact with the media service, including discovering and/or accessing media programs distributed by way of the media service.

A user computing system 1202 may be configured for use by a user 1204 associated with (e.g., operating) the user computing system 1202 to access the media service provided by system 100. For example, a user computing system 1202 may include a media player configured to present media programs provided by the media service. In some examples, the user 1204 may utilize the user computing system 1202 to access one or more user interfaces provided by system 100 as part of the media service, and to present the user interfaces for use by the user 1204 to discover, access, and/or consume media programs distributed by server system 1206 as part of the media service.

A user computing system 1202 may include one or more user computing devices associated with a user 1204. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 1202 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 1202 may include any combination of user computing devices or a single user computing device configured to perform any of the user computing system and/or device operations described herein.

Figure 13:
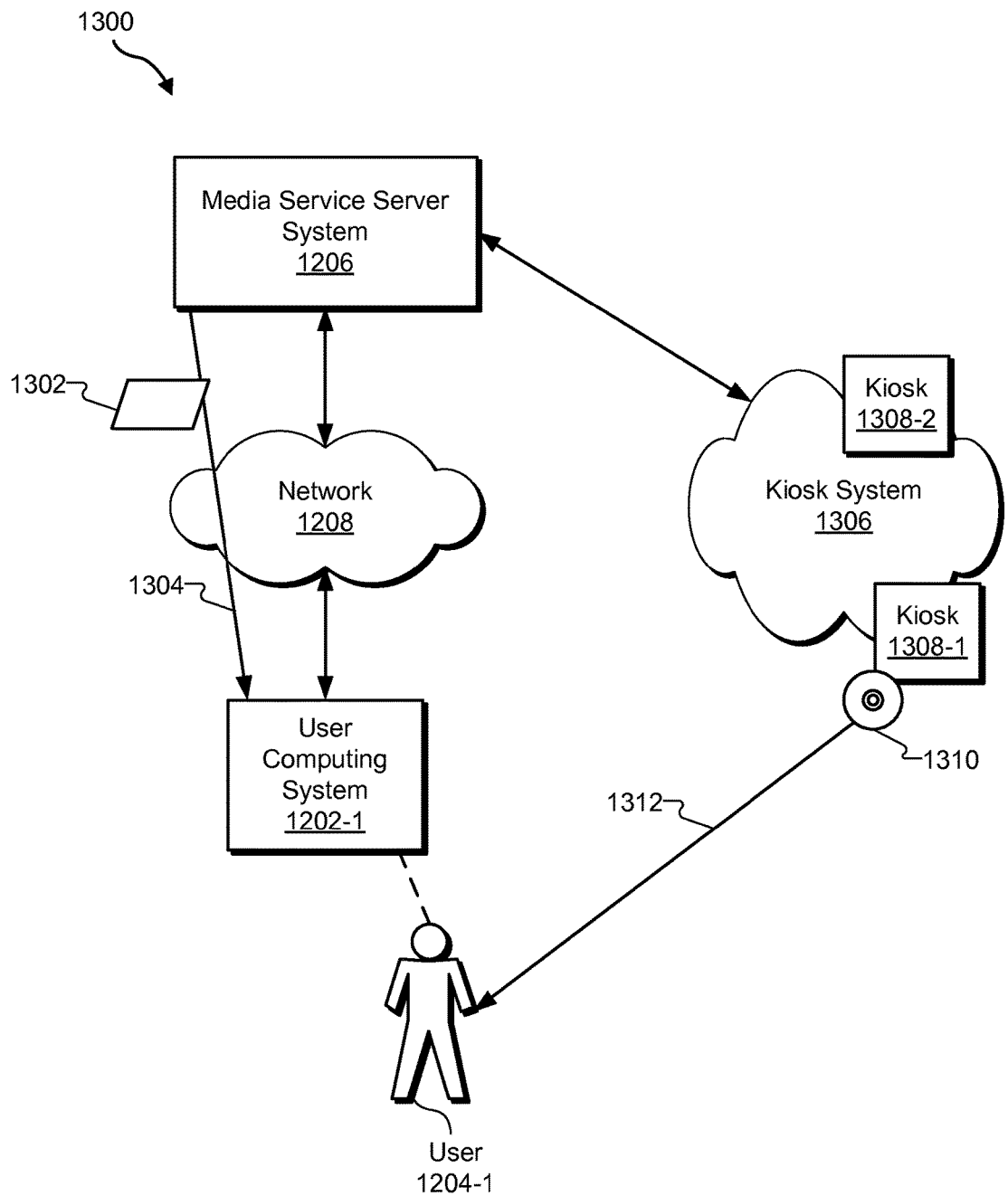
FIG. 13 shows another exemplary implementation of the system of FIG. 1 according to principles described herein.

FIG. 13 illustrates an exemplary implementation 1300 of system 100. Implementation 1300 is similar to implementation 1200 and additionally utilizes an exemplary media distribution configuration to distribute media programs to end users of a media distribution service. The media distribution configuration may support distribution of media programs, through the media distribution service, by way of multiple different media distribution channels, such as a digital media distribution channel and a physical media distribution channel. As shown, server system 1206 may distribute media programs such as digital data 1302 representative of a media program to user computing system 1202-1 by way of a digital media distribution channel 1304. This distribution may utilize any suitable media streaming and/or downloading technologies (e.g., Internet media streaming and/or downloading technologies) to support delivery of digital data representative of media programs to user computing system 1202 by way of network 1208.

As further shown in FIG. 13, server system 1206 may be in communication with a media vending kiosk system 1306, which may include one or more geographically distributed vending kiosks 1308 (e.g., vending kiosks 1308-1 and 1308-2) configured to vend physical copies of media programs, such as a physical copy 1310 of a media program, to user 1204-1 by way of a physical media distribution channel 1312. For example, user 1204-1 may visit a location of media vending kiosk 1308-1 and obtain the physical copy 1310 of the media program from the media vending kiosk 1308-1. In certain examples, one or more of the vending kiosks 1308 may include automated media vending machines.

In certain examples, implementation 1300 may be configured to provide users of the media distribution service with access to media programs by way of a plurality of different media distribution models ("distribution models"). Each distribution model may define a particular way that an end user of the media distribution service may gain access to media programs through the media distribution service. Thus, a user of the media distribution service may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 1304 of FIG. 13, and a physical media distribution model may include or utilize the physical media distribution channel 1312 of FIG. 13.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media distribution service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 14:
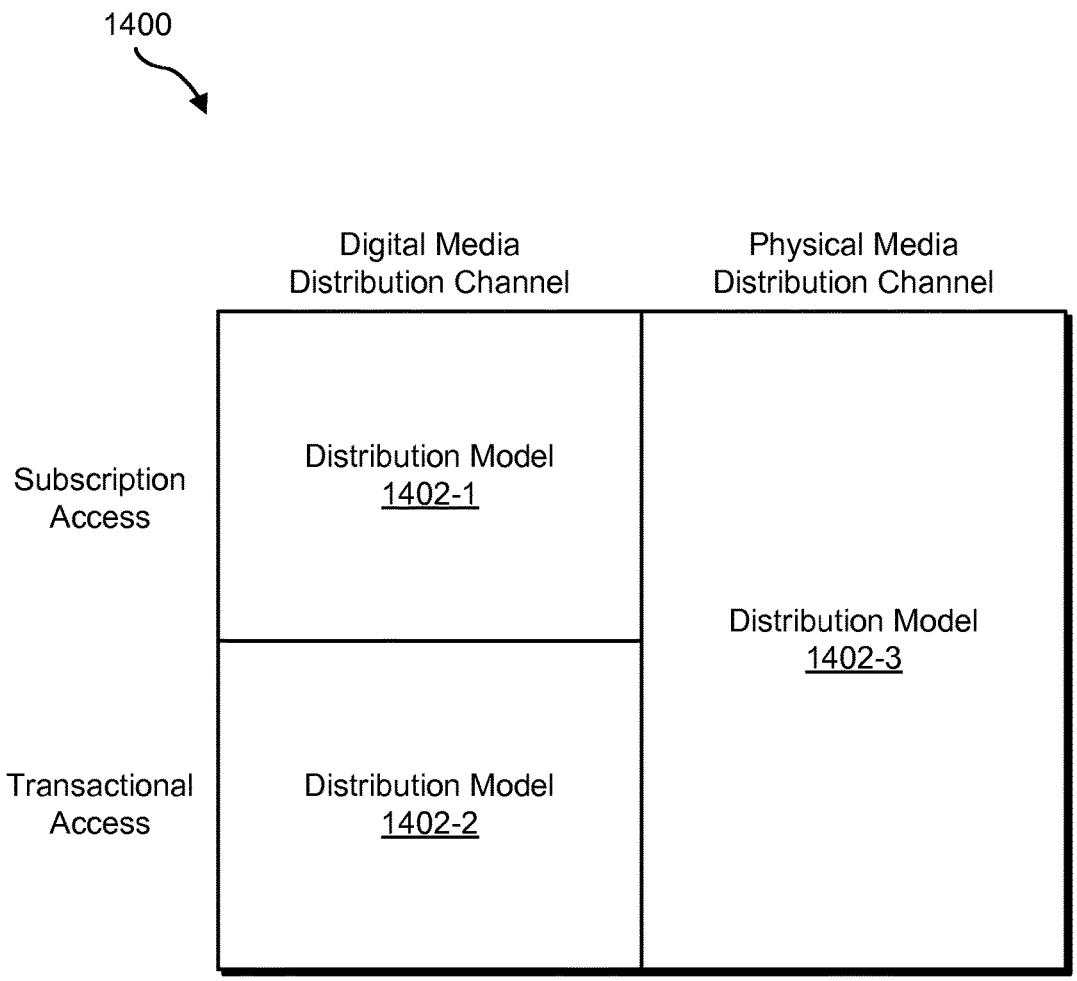
FIG. 14 illustrates a table representing an exemplary set of different media distribution models by way of which access to media programs may be provided by way of a media distribution service according to principles described herein.

Implementation 1300 may be configured to provide users of the media distribution service with access to media programs by way of any of the different distribution models described herein, or by way of any combination or subcombination thereof. As an example, FIG. 14 illustrates a table 1400 representing a set of different distribution models by way of which access to media programs may be provided through the media distribution service in certain examples. As shown, the set of distribution models includes a first distribution model 1402-1 associated with subscription-based access to media programs by way of a digital media distribution channel, a second distribution model 1402-2 associated with transactional-based access to media programs by way of the digital media distribution channel, and a third distribution model 1402-3 associated with either or both subscription-based or transactional-based access to media programs by way of a physical media distribution channel. In certain examples, these distribution models 1402 may be referred to as a "subscription" digital distribution model 1402-1, an "on-demand" or "rent/buy" digital distribution model 1402-2, and a "physical" or "kiosk" distribution model 1402-3.

Media programs distributed by implementation 1300 as part of the media distribution service may be assigned (e.g., by a provider of the media distribution service) to one or more of the distribution models provided by implementation 1300. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 1402-3 only. At the end of that period of time, the media program may leave distribution model 1402-3, meaning that the media program is no longer accessible by way of distribution model 1402-3. For a second period of time, however, the same media program may be distributed by way of distribution model 1402-2 only. For example, when the media program leaves distribution model 1402-3, the media program may be added to distribution model 1402-2. At the end of the second period of time, the same media program may leave distribution model 1402-2 and be assigned to distribution model 1402-1. This example is illustrative only, a media program may be made accessible by way of different distribution models or specific combinations of distribution models for specific periods of time, and may be added to or removed from any distribution model in any suitable way.

Implementation 1300 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

In certain examples, management facility 102 may use a library of on-demand media content associated with any of the on-demand media distribution models provided by implementation 1300, such as a digital subscription-based media distribution model and/or a digital transactional-based media distribution model provided by implementation 1300, to curate media programs for a media-on-demand-based programming channel in any of the ways described herein. In certain examples, management facility 102 may provide a media-on-demand-based programming channel as part of the media distribution service provided by implementation 1300.

Figure 15:
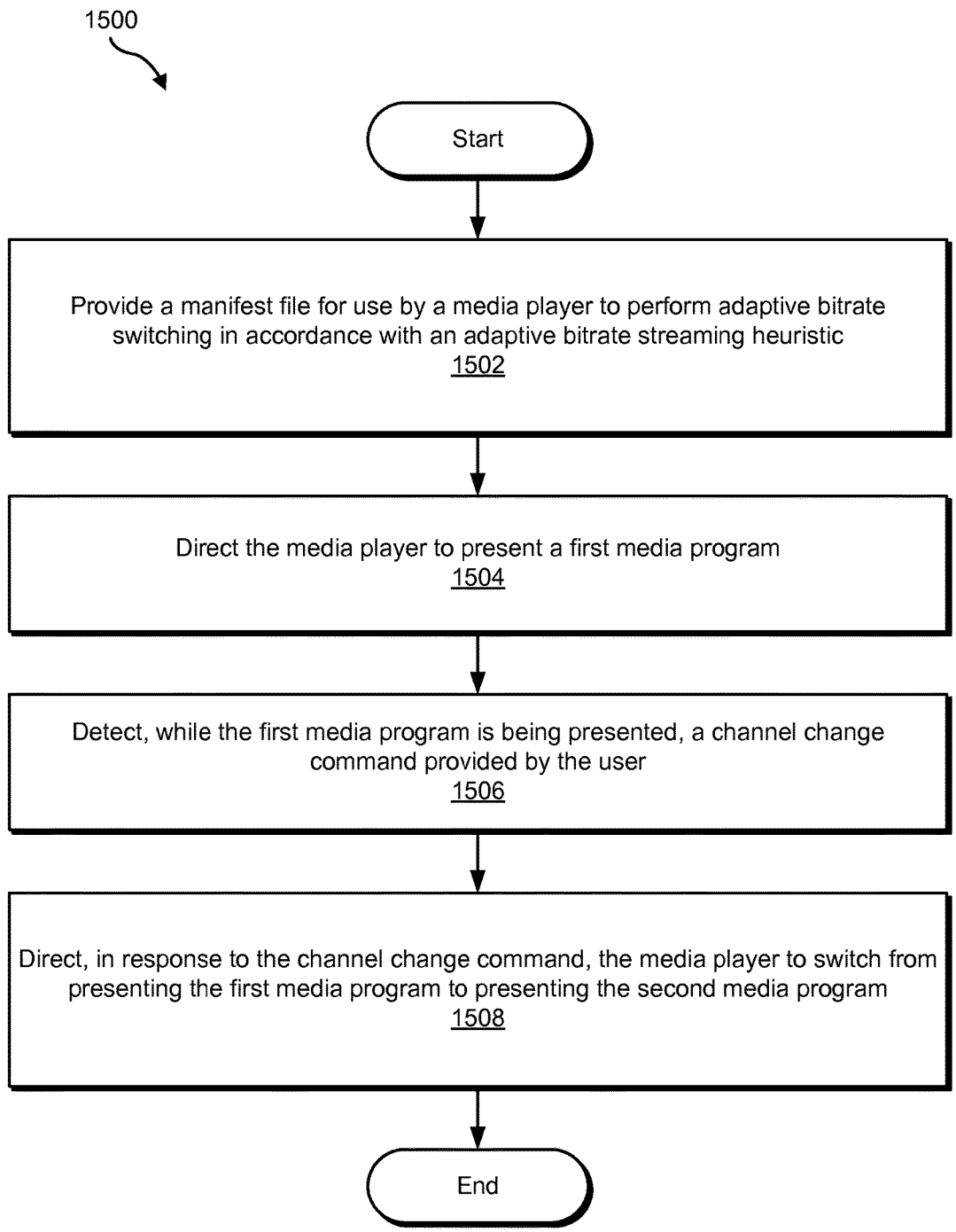
FIGS. 15-16 illustrate exemplary methods of facilitating media-on-demand-based channel changing according to principles described herein.
Figure 16:
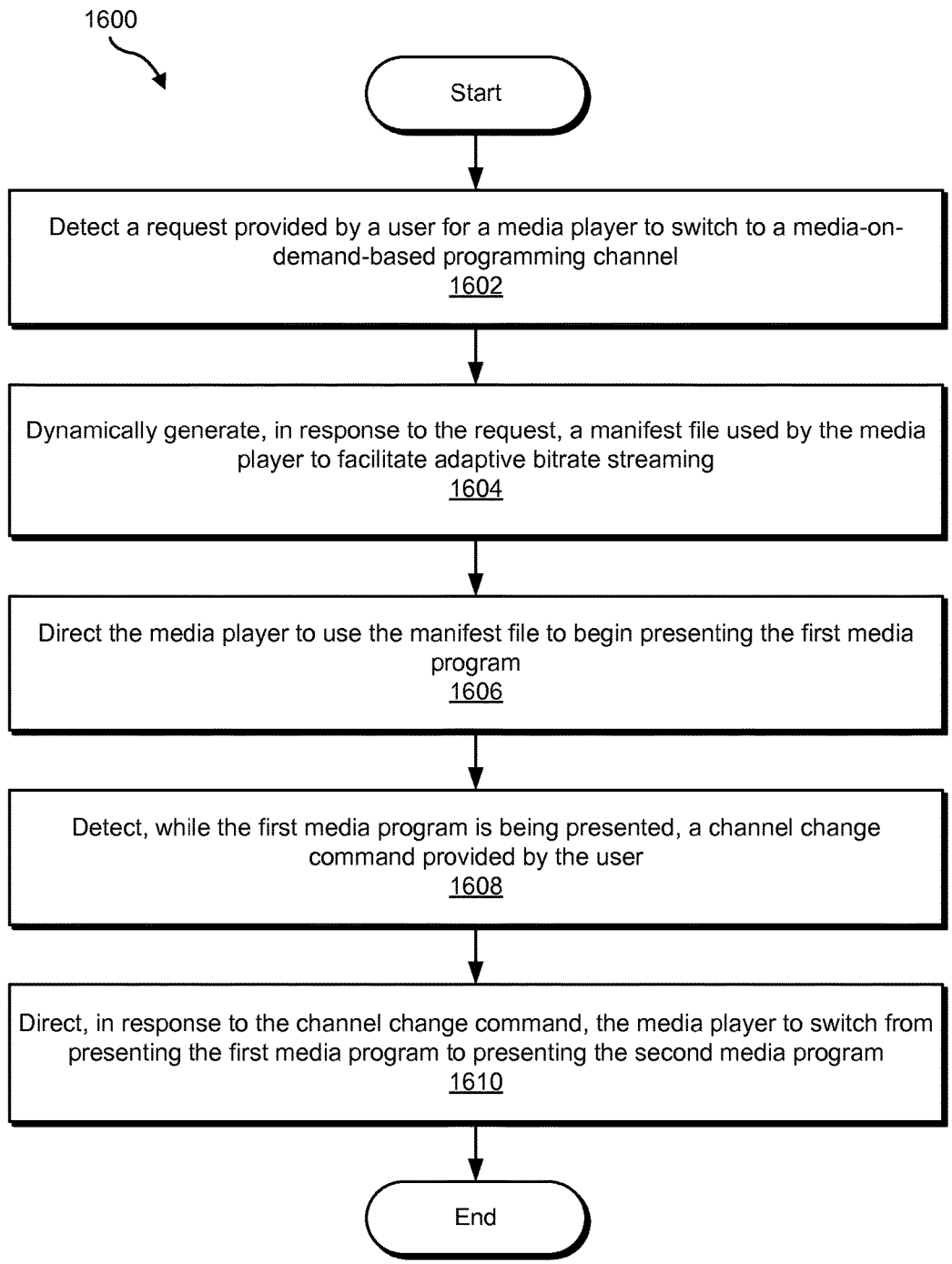

FIGS. 15-16 illustrate exemplary methods 1500 and 1600 of facilitating media-on-demand-based channel changing according to principles described herein. While FIGS. 15-16 illustrate exemplary steps according to certain embodiments, other embodiments may omit, add to, reorder, combine, and/or modify any of the steps shown in FIGS. 15-16. In certain embodiments, one or more of the steps shown in FIGS. 15-16 may be performed by system 100 and/or one or more components or implementations of system 100.

Turning to the method 1500 illustrated in FIG. 15, in step 1502, a system (e.g., system 100) provides a manifest file for use by a media player to perform adaptive bitrate switching in accordance with an adaptive bitrate streaming heuristic. As described herein, the manifest file may include data that associates a first media program provided by an on-demand media service with a first bitrate and a second media program provided by the on-demand media service with a second bitrate. Step 1502 may be performed in any of the ways described herein.

In step 1504, the system directs the media player to present the first media program. Step 1504 may be performed in any of the ways described herein.

In step 1506, the system detects, while the first media program is being presented, a channel change command provided by the user. Step 1506 may be performed in any of the ways described herein.

In step 1508, the system directs, in response to the channel change command, the media player to switch from presenting the first media program to presenting the second media program. Step 1508 may be performed in any of the ways described herein. For example, the system may provide the media player with a command to use the manifest file to switch from the first bitrate to the second bitrate in accordance with the adaptive bitrate streaming heuristic.

Turning to the method 1600 illustrated in FIG. 16, in step 1602, a system (e.g., system 100) detects a request provided by a user for a media player to switch to a media-on-demand-based programming channel. As described above, the media-on-demand-based programming channel may represent a scheduled, linear playback of a set of on-demand media programs mapped to the media-on-demand-based programming channel. In this example, the set of on-demand media programs includes at least a first media program and a second media program. Step 1602 may be performed in any of the ways described herein.

In step 1604, the system dynamically generates, in response to the request, a manifest file used by the media player to facilitate adaptive bitrate streaming. The manifest file may include data that associates the first media program with a first bitrate and a second media program with a second bitrate. Step 1604 may be performed in any of the ways described herein.

In step 1606, the system directs the media player to use the manifest file to begin presenting the first media program. Step 1606 may be performed in any of the ways described herein.

In step 1608, the system detects, while the first media program is being presented, a channel change command provided by the user. Step 1608 may be performed in any of the ways described herein.

In step 1610, the system directs, in response to the channel change command, the media player to switch from presenting the first media program to presenting the second media program. Step 1610 may be performed in any of the ways described herein. For example, the system may provide the media player with a command to use the manifest file to switch from the first bitrate to the second bitrate in accordance with the adaptive bitrate streaming heuristic.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 17:
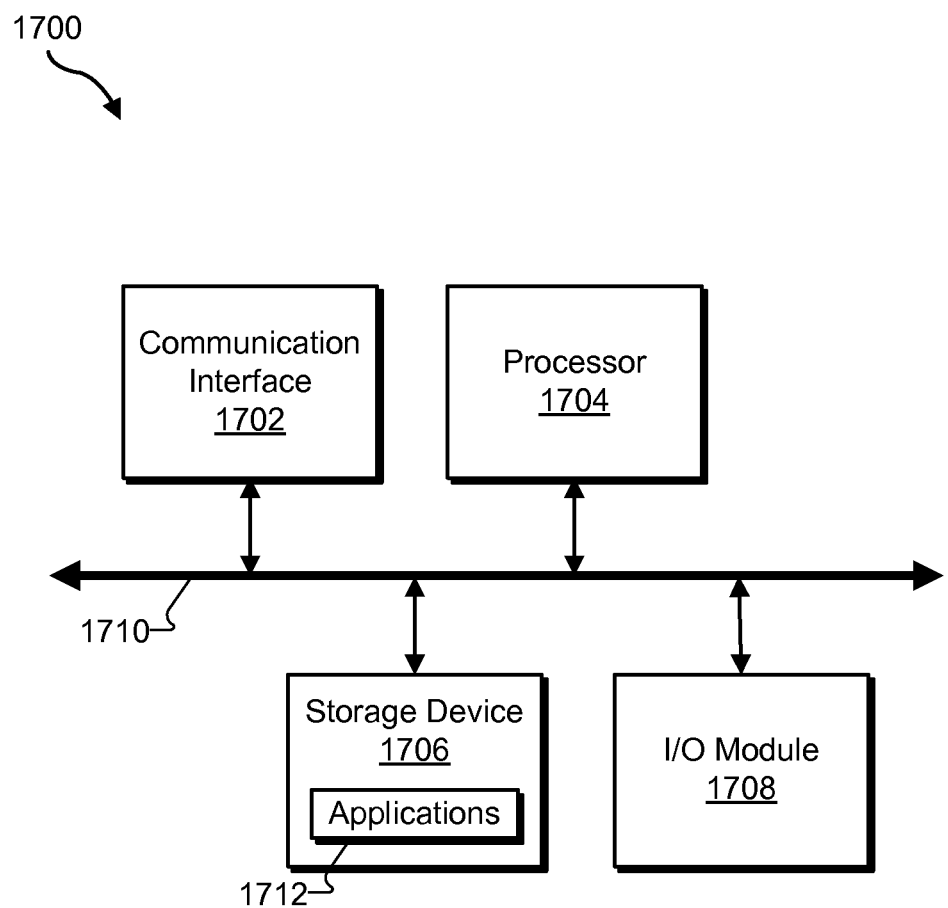
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional, fewer, or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may execute and/or direct execution of operations as directed by one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1706. For example, data representative of one or more applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1708 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with detection facility 102 and/or management facility 104. Likewise, storage facility 106 may be implemented by or within storage device 1706. Such an implementation may be referred to as a computer-implemented system, such as a computer-implemented media service system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a computer-implemented media service system, a manifest file configured to trick a media player into seamlessly switching between presenting different media programs by leveraging an adaptive bitrate switching capability of the media player performed in accordance with an adaptive bitrate streaming heuristic, the manifest file configured to trick the media player by being generated to include
data that associates a first bitrate with data chunks of a first media program provided by an on-demand media service, the data chunks of the first media program encoded with a particular bitrate, and
data that associates a second bitrate different from the first bitrate with data chunks of a second media program provided by the on-demand media service, the data chunks of the second media program encoded with the particular bitrate;

directing, by the computer-implemented media service system, the media player to present the first media program;

detecting, by the computer-implemented media service system while the first media program is being presented, a channel change command provided by a user; and directing, by the computer-implemented media service system in response to the channel change command, the media player to switch from presenting the first media program at the particular bitrate to presenting the second media program at the particular bitrate by providing the media player with a command to use the manifest file to switch from the first bitrate to the second bitrate in accordance with the adaptive bitrate streaming heuristic.

2. The method of claim 1, wherein:

the first and second media programs are mapped to a single media-on-demand-based programming channel provided by the on-demand media service; and the channel change command comprises a command for the media player to switch from presenting the first media program to presenting the second media program mapped to the single media-on-demand-based programming channel.

3. The method of claim 2, further comprising:

detecting, by the computer-implemented media service system prior to directing the media player to present the first media program, a request provided by the user to switch to the media-on-demand-based programming channel;

wherein the providing of the manifest file comprises dynamically generating the manifest file in response to the request; and wherein the directing of the media player to present the first media program is performed in response to the request.

4. The method of claim 1, wherein:

the first media program is mapped to a first media-on-demand-based programming channel provided by the on-demand media service;

the second media program is mapped to a second media-on-demand-based programming channel provided by the on-demand media service; and the channel change command comprises a command for the media service to switch from the first media-on-demand-based programming channel to the second media-on-demand-based programming channel.

5. The method of claim 1, further comprising:

maintaining, by the computer-implemented media service system, the data chunks of the first media program in a first set of data chunks and the data chunks of the second media program in a second set of data chunks, the data chunks in the first set of data chunks representative of a plurality of segments of the first media program and the data chunks in the second set of data chunks representative of a plurality of segments of the second media program;

wherein the manifest file is further generated to include further includes pointer data that points to a storage location of each data chunk included in the first and second sets of data chunks.

6. The method of claim 5, wherein:

the directing of the media player to present the first media program comprises directing the media player to use the pointer data included in the manifest file to download a first data chunk included in the first set of data chunks, and use the first data chunk to present a first segment of the first media program that is represented by the first data chunk; and the channel change command is provided by the user during the presentation of the first segment of the first media program.

7. The method of claim 6, wherein:

the first segment of the first media program is assigned to and presented during a first time slot within a scheduled presentation time period; and the directing of the media player to switch from presenting the first media program to presenting the second media program comprises directing the media player to use the pointer data included in the manifest file to download a second data chunk included in the second set of data chunks and that represents a second segment of the second media program that is assigned to a second time slot that is temporally adjacent and subsequent to the first time slot within the scheduled presentation time period, and use the second data chunk to present the second segment of the second media program during the second time slot.

8. The method of claim 6, wherein:

the first segment of the first media program is assigned to and presented during a first time slot within a scheduled presentation time period;

the detecting of the channel change command comprises identifying a first timestamp within the first time slot at which the channel change command is provided by the user; and the directing of the media player to switch from presenting the first media program to presenting the second media program comprises directing the media player to use the pointer data included in the manifest file to download a second data chunk included in the second set of data chunks and that represents a second segment of the second media program that is assigned to the first time slot, and use the second data chunk to present the second segment of the second media program during the first time slot beginning at a second timestamp that is temporally subsequent to the first timestamp.

9. The method of claim 5, wherein the first and second sets of data chunks are encrypted using a common key.

10. The method of claim 5, wherein:

the second set of data chunks is representative of a first resolution version of the second media program;

the directing of the media player to switch from presenting the first media program to presenting the second media program comprises directing the media player to switch from presenting the first media program to presenting the first resolution version of the second media program;

the method further comprises maintaining, by the computer-implemented media service system, a third set of data chunks representative of a second resolution version of the second media program; and the manifest file is further generated to include data that associates a third bitrate with data chunks of the second resolution version of the second media program, the third bitrate different from the first and second bitrates.

11. The method of claim 10, further comprising:
detecting, by the computer-implemented media service system, that the user abstains from providing an additional channel changing command for a predetermined amount of time while the first resolution version of the second media program is being presented; and
directing, by the computer-implemented media service system in response to the detecting that the user abstains from providing the additional channel changing command for the predetermined amount of time, the media player to switch from presenting the first resolution version of the second media program to presenting the second resolution version of the second media program by providing the media player with a command to use the manifest file to switch from the second bitrate to the third bitrate.

12. The method of claim 1, embodied as computer-executable instructions on at least one non-transitory computer-readable medium.

13. A method comprising:
detecting, by a computer-implemented media service system, a request provided by a user for a media player to switch to a media-on-demand-based programming channel, the media-on-demand-based programming channel representing a scheduled, linear playback of a set of on-demand media programs mapped to the media-on-demand-based programming channel, the set of on-demand media programs comprising a first media program and a second media program different from the first media program;
dynamically generating, by the computer-implemented media service system in response to the request, a manifest file configured to trick the media player into seamlessly switching between presenting different media programs by leveraging an adaptive bitrate switching capability of the media player, the manifest file configured to trick the media player by being dynamically generated to include
data that associates a first bitrate with data chunks of the first media program, the data chunks of the first media program encoded with a particular bitrate, and
data that associates a second bitrate different from the first bitrate with data chunks of the second media program, the data chunks of the second media program encoded with the particular bitrate;
directing, by the computer-implemented media service system, the media player to use the manifest file to begin presenting the first media program;
detecting, by the computer-implemented media service system while the first media program is being presented, a channel change command provided by the user; and
directing, by the computer-implemented media service system in response to the channel change command, the media player to switch from presenting the first media program at the particular bitrate to presenting the second media program at the particular bitrate by providing the media player with a command to use the manifest file to switch from the first bitrate to the second bitrate in accordance with the adaptive bitrate streaming heuristic.

14. The method of claim 13, further comprising:
maintaining, by the computer-implemented media service system, the data chunks of the first media program in a first set of data chunks and the data chunks of the second media program in a second set of data chunks, the data chunks in the first set of data chunks representative of a plurality of segments of the first media program and the data chunks in the second set of data chunks representative of a plurality of segments of the second media program;
wherein the manifest file is further generated to include pointer data that points to a storage location of each data chunk included in the first and second sets of data chunks.

15. The method of claim 14, wherein:
the directing of the media player to use the manifest file to begin presenting the first media program comprises directing the media player to
use the pointer data included in the manifest file to download a first data chunk included in the first set of data chunks, and
use the first data chunk to present a first segment of the first media program that is represented by the first data chunk; and
the channel change command is provided by the user during the presentation of the first segment of the first media program.

16. The method of claim 15, wherein:
the first segment of the first media program is assigned to and presented during a first time slot within a scheduled presentation time period; and
the directing of the media player to switch from presenting the first media program to presenting the second media program comprises directing the media player to
use the pointer data included in the manifest file to download a second data chunk included in the second set of data chunks and that represents a second segment of the second media program that is assigned to a second time slot that is temporally adjacent and subsequent to the first time slot within the scheduled presentation time period, and
use the second data chunk to present the second segment of the second media program during the second time slot.

17. The method of claim 15, wherein:
the first segment of the first media program is assigned to and presented during a first time slot within a scheduled presentation time period;
the detecting of the channel change command comprises identifying a first timestamp within the first time slot at which the channel change command is provided by the user; and
the directing of the media player to switch from presenting the first media program to presenting the second media program comprises directing the media player to
use the pointer data included in the manifest file to download a second data chunk included in the second set of data chunks and that represents a second segment of the second media program that is assigned to the first time slot, and
use the second data chunk to present the second segment of the second media program during the first time slot beginning at a second timestamp that is temporally subsequent to the first timestamp.

18. The method of claim 13, embodied as computer-executable instructions on at least one non-transitory computer-readable medium.

19. A system comprising:
at least one physical computing device that
provides a manifest file configured to track a media player into seamlessly switching between presenting different media programs by leveraging an adaptive bitrate switching capability of the media player performed in accordance with an adaptive bitrate streaming heuristic, the manifest file configured to trick the media player by being generated to include data that associates a first bitrate with data chunks of a first media
   program provided by an on-demand media service, the data chunks of the first media program encoded with a particular bitrate, and
   data that associates a second bitrate different from the first bitrate with data chunks of a second media program provided by the on-demand media service, the data chunks of the second media program encoded with the particular bitrate;
directs the media player to present the first media program,
detects, while the first media program is being presented, a channel change command provided by a user, and
directs, in response to the channel change command, the media player to switch from presenting the first media program to presenting the second media program by providing the media player with a command to use the manifest file to switch from the first bitrate to the second bitrate in accordance with the adaptive bitrate streaming heuristic.

20. The system of claim 19, wherein the first and second media programs are mapped to a single media-on-demand-based programming channel provided by the on-demand media service.

* * * * *